United States Patent [19]

Saltman

[11] Patent Number: 5,091,478
[45] Date of Patent: Feb. 25, 1992

[54] PARTIALLY GRAFTED THERMOPLASTIC COMPOSITIONS

[75] Inventor: Robert P. Saltman, Townsend, Del.

[73] Assignee: E. I. Du Pont de Nemours and Company, Wilmington, Del.

[21] Appl. No.: 526,953

[22] Filed: May 21, 1990

Related U.S. Application Data

[63] Continuation of Ser. No. 117,941, Nov. 13, 1987, abandoned, which is a continuation-in-part of Ser. No. 930,843, Nov. 14, 1986, abandoned.

[51] Int. Cl.$^5$ ............................................. C08L 77/00
[52] U.S. Cl. ................................... 525/179; 525/166; 525/173; 525/175; 525/176; 525/182; 525/183
[58] Field of Search .................... 525/179, 182, 183

[56] References Cited

U.S. PATENT DOCUMENTS

| | | | |
|---|---|---|---|
| Re. 30,754 | 9/1881 | Hammer | 525/379 |
| 4,172,859 | 10/1979 | Epstein | 428/402 |
| 4,174,358 | 11/1979 | Epstein | 525/183 |
| 4,299,744 | 11/1981 | Stewart | 525/183 |
| 4,310,638 | 1/1982 | Coran et al. | 525/183 |
| 4,338,413 | 7/1982 | Coran et al. | 525/179 |
| 4,346,194 | 8/1982 | Roura | 525/66 |
| 4,404,325 | 9/1983 | Mason et al. | 525/179 |
| 4,517,340 | 5/1985 | Read et al. | 525/113 |
| 4,528,329 | 7/1985 | Inoue et al. | 525/74 |
| 4,550,130 | 10/1985 | Kishida et al. | 523/436 |
| 4,555,546 | 11/1985 | Patel | 525/194 |
| 4,595,730 | 6/1986 | Blondel | 525/178 |
| 4,602,058 | 7/1986 | Graham et al. | 524/320 |
| 4,694,042 | 9/1987 | McKee | 525/66 |
| 4,720,516 | 1/1988 | Kishida et al. | 523/436 |

FOREIGN PATENT DOCUMENTS

| | | |
|---|---|---|
| 168139 | 1/1986 | European Pat. Off. |
| 1519013 | 7/1983 | France |
| 59-86677 | 5/1984 | Japan |
| 59-115352 | 7/1984 | Japan |
| 8503718 | 8/1985 | PCT Int'l Appl. |
| 8606377 | 11/1986 | PCT Int'l Appl. |
| 2197654 | 5/1988 | United Kingdom |

*Primary Examiner*—Ana L. Carrillo

[57] ABSTRACT

Partially grafted flexible thermoplastic compositions formed by melt blending under high shear, a thermoplastic material having available graft sites, said thermoplastic material being at least one continuous phase of the composition, an ethylene copolymer containing an unsaturated mono-carboxylic acid, and a polymeric grafting agent having reactive groups capable of reacting with the mono-carboxylic acid in the ethylene copolymer and with the available graft sites in the thermoplastic material. These compositions have use in a wide range of molding, coating and adhesive applications, including various automotive applications, wire and cable coating applications and high temperature adhesive applications.

8 Claims, No Drawings

PARTIALLY GRAFTED THERMOPLASTIC COMPOSITIONS

CROSS REFERENCE TO RELATED APPLICATION

This application is a continuation of application Ser. No. 07/117,941 filed Nov. 13, 1987 now abandoned, which, is a continuation-in-part of copending U.S. application Ser. No. 930,843 filed Nov. 14, 1986.

TECHNICAL FIELD

This invention relates to certain partially grafted flexible thermoplastic compositions which possess a unique combination of unexpectedly superior high temperature properties. While conventional flexible thermoplastics may have useful combinations of properties at room temperature, generally such materials exhibit severe deterioration of high temperature properties, making these materials unsuited for applications such as automotive under-the-hood use. More specifically, this invention relates to partially grafted flexible thermoplastic compositions derived from a minor proportion of a thermoplastic material, ethylene copolymers containing an acid moiety, and a multi-functional polymeric grafting agent derived from ethylene, which grafting agent is capable of reacting with both the acid-containing ethylene copolymer and the thermoplastic material. The compositions of the present invention will be multi-phase blends of the thermoplastic material and the ethylene copolymers containing an acid moiety which have been partially grafted to each other, and which blends have at least one continuous phase which is the thermoplastic material.

In a system where the three components, the thermoplastic material, the ethylene copolymer containing an acid moiety and the grafting agent, all have functional groups and may cross react, one would expect to create an intractable network, since all polymeric components are covalently linked via the polymeric grafting agent. In this invention, this undesirable situation is avoided by carefully controlling the sum total of all reactive groups from the polymeric grafting agent present in the blend, such that there will result a composition having an unexpectedly good combination of high temperature properties, while not sacrificing the basic thermoplastic character of the composition. Too little grafting between the polymeric grafting agent and the acid-containing ethylene copolymer, does not result in the proper phase relationship in these multi-phase blends, namely, that the thermoplastic must be at least one of the continuous phases. Further, too much grafting will result in compositions that exhibit severe melt fracture, that give extrudates very rough in appearance, or the resulting compositions will simply be intractable.

The compositions of the present invention have potential for use in a wide range of applications. For example, the combination of good high temperature properties suggests under-the-hood use in automotive applications. A good balance of chemical resistance makes these compositions suitable for use in hydraulic, gas, brake or other types of hose applications. Excellent toughness and high tear strength suggests utility for these compositions in ski boots, appliance housings and automotive bumpers. High quality surface in molded articles made from these compositions make them well suited for automotive facia. The combination of good retention of high temperature properties, good low temperature flexibility, and good electrical properties open a variety of wire and cable coating applications for these materials. Also, the high temperature performance and low temperature flexibility of these materials make them useful candidates in formulations for high temperature adhesive applications. These compositions readily accept flame retardants, making them useful for commercial applications requiring low flammability. Irradiation of these materials yields substantial physical property improvements making them useful as heat shrinkable jacketing materials and cable connectors. The good melt strength of these compositions makes them amenable to foaming. They can be filled with glass, graphite, Kevlar ® aramid fiber, as well as other short-fiber reinforcements, to achieve exceptionally high heat deflection temperatures for load bearing applications, and to impart surprisingly improved wear resistance. These materials readily accept clay, mica and other mineral fillers to be useful as sound, or vibrational damping materials, as well as glass spheres to lower their buoyant density.

BACKGROUND ART

U.S. Pat. No. 4,555,546, granted Nov. 26, 1985 to Patel, discloses compatabilized polymer blends of olefin polymer, cross-linkable acrylic ester copolymer rubber, and a compatabilizing graft copolymer. The graft copolymer will contain one segment that is compatible with the olefin polymer in the above-mentioned blend; the graft copolymer will contain another segment that is compatible with the rubber in the above-mentioned blend; and these two segments are chemically linked to each other, for example, by grafting or formation of a block copolymer. The first segment is generically disclosed as including various polyolefins which optionally may also include any one of many different functional groups. Included within this description are copolymers of ethylene and an unsaturated carboxylic acid. The second segment is generically disclosed as including at least nine different classes of polymers. One of the classes so mentioned is polyaides. And finally, it is disclosed that the grafting of these segments to each other can be achieved by including in either or both of the above-described segments graft forming functional groups, or by reacting these two segments with a bi- or multi-functional compound (grafting agent). A large number of suitable functional groups and grafting agents are disclosed, among them epoxide groups and compounds containing the same. Thus, if one picks and chooses among the various possibilities generically disclosed by Patel, one can select at least some of the ingredients which are used to make the compositions of the present invention. However, nothing in Patel suggests the particular selection of ingredients which are used to make the compositions of the present invention, much less the particular quantitative limits specified for such ingredients in the compositions of the present invention, or that the compositions of the present invention are multi-phase blends which blends have at least one continuous phase that is a thermoplastic material having reactive graft sites.

U.S. Pat. No. 4,310,638, granted Jan. 12, 1982 to Coran et al., discloses thermoplastic elastomeric compositions comprising neutralized acrylic copolymer rubber modified with nylon. Coran discloses a simple two-component blend where one component comprises 60–98% neutralized acrylic rubber and the other component comprises 2-40% nylon. Coran does not recognize the significance of a third component which grafts the other two components together, nor does Coran recognize the importance of having the thermoplastic component as a continuous phase.

U.S. Pat. No. 4,338,413, granted July 6, 1982 to Coran et al., describes a complex five-component composition consisting of a blend of plastics and cured rubbers in which the plastics are a crystalline polyolefin polymer and nylon, and the rubbers are a cured particulate hydrocarbon rubber and a cured particulate polar rubber. The thermoplastic components are in turn tied together by a functionalized olefin polymer. The functionalized olefin polymer is used to improve the compatability between the crystalline polyolefin component and the nylon component. The Coran compositions require two plastics with two cured rubbers.

U.S. Pat. No. 4,602,058, granted July 22, 1986 to Graham et al., discloses blends of nylon with acid copolymers. The "thermostability and compatability" of these blends is improved by the addition of monomeric diacids. These diacids work because they inhibit interactive cross-linking between the nylon and the acid copolymer. This is the converse of the current invention, where grafting of the ethylene copolymer containing the acid moiety is not inhibited but encouraged by use of the polymeric grafting agent that links, for example, the polyamide thermoplastic and ethylene copolymer components.

U.S. Pat. Nos. 4,174,358 and 4,172,859 granted Nov. 13, 1979, and Oct. 30, 1979, respectively, to Epstein, disclose blends of thermoplastic nylon and polyester compositions containing various toughening agents, including ethylene/acrylate/methacrylic acid terpolymers and ethylene/acrylate/glycidyl methacrylate terpolymers. Three-component blends are possible, but the toughening agents are disclosed as being in a dispersed particle phase having a particle size ranging from 0.1-1 microns. Further, these compositions are disclosed as being 60-99 weight % polyamide or polyester, and the importance of the presence of both a grafting moiety and an ethylene copolymer containing an acid moiety is not recognized. The importance of regulating the specific quantity of the grafting moiety and the ethylene copolymer is not disclosed by Epstein. Finally, there is no minimum particle size required by the current invention, and often the particle size is several microns without any adverse affects on the properties of these materials.

U.S. Pat. No. 4,595,730, granted June 17, 1986 to Blondel et al., disclosed synthesis of novel polymers or oligomers which are polyamides with an ethylenic unsaturation at one end. They are made by copolymerizing amino acid monomers with a small amount of unsaturated acid which blocks one end of the nylon chain and gives the unsaturation. Alternatively, the end group can be generated from an unsaturated compound containing an epoxy group. The epoxy group then reacts with the nylon during polymerization to result in terminal unsaturation. These unsaturated polymers may be further reacted by grafting onto other polymers, including ethylene/vinyl acetate/glycidyl methacrylate terpolymers and ethylene/vinyl acetate/methacrylic acid terpolymers. However, such grafting is via the ethylenic unsaturation and not by means of an intermediate such as the epoxy group. There is no recognition of the importance of limiting the quantity of the grafting agent since no separate grafting agent is used. In addition, Blondel specifically attempts to avoid cross-linking by means of a rather cumbersome procedure, that is, specifically synthesizing nylon chains which have one and only one functional group which is available for grafting.

U.S. Pat. No. Reissue 30,754, reissued Sept. 29, 1981 on U.S. Pat. No. 3,972,961, originally granted Aug. 3, 1976 to Hammer et al., discloses graft copolymers made by reaction of nylon oligomers or other compounds which have a single reactive $NH_3$ group on one end only. These oligomers are reacted with anhydride or equivalent groups on a trunk copolymer. The presence of only one reactive group on the nylon oligomers prevents cross-linking. The polymers obtained can be used for hot melt adhesives which have better high temperature properties than ungrafted ethylene copolymers. There is no requirement for oligomers of nylon with only one reactive group in the current invention. In fact, it is required to have high molecular weight thermoplastics, rather than oligomers, to achieve the outstanding physical properties of the current invention, and that the thermoplastics with available graft sites, have at least two or more graft sites per polymer chain.

Japanese patent No. 59-115352, published July 3, 1984, and filed by Unitika Ltd., discloses toughened polyester compositions containing 100 parts by weight of a thermoplastic polyester, 3 to 50 parts by weight of a modified polyolefin that contains an alicyclic carboxylic acid with a cis-type double bond in the ring, and 1 to 50 parts by weight of an alpha-olefin-glycidyl (meth)acrylate-vinyl acetate copolymer comprised of 80 to 99 weight % alpha-olefin, 1 to 20 weight % glycidyl (meth)acrylate, and 0 to 19 weight % vinyl acetate. Unitika discloses a clear preference for the modified polyolefin to contain vinyl acetate. In the pending application, the use of vinyl acetate is excluded. Vinyl acetate pyrolyzes at the elevated melt temperatures; e.g., those required to process the compositions of the current invention ($>200°$ C. melt temperatures). One pyrolysis product, acetic acid, is detrimental to a number of the thermoplastic matrix resins described in the current invention, such as polyesters, polyamides, and polycarbonates. In addition, Unitika modified polyolefin contains alicyclic carboxylic acid (presumably dicarboxylic acid) with a cis-type double bond in the ring. The present invention avoids such acids because of inability to control the graft reaction. Finally, Unitika relates to toughening polyester compositions (compositions containing at least 50 weight % polyester). The present invention relates to flexible thermoplastic compositions which have a maximum of 50 volume % thermoplastic. At these low levels of thermoplastic, it is a key feature of the current invention that the thermoplastic be at least one of the continuous phases.

PCT publication number 85/03718 published Aug. 29, 1985 discloses toughened thermoplastic polyester compositions containing 60-97 weight % of polyester and 3-40 weight % of a toughener derived from E/X/Y where E is a radical formed from ethylene, X is a radical formed from an alkyl acrylate, and Y is glycidyl methacrylate or glycidyl acrylate. Again, these compositions are toughened polyester thermoplastics with greater than 60 weight % of polyester. These compositions have only two different polymeric components compared to the three different polymeric components required in the pending application.

U.S. Pat. No. 4,694,042 granted Sept. 15, 1987 to McKee et al, discloses thermoplastic molding materials containing 5-50 parts by volume thermoplastic material as a coherent phase and 95-50 parts by volume of crosslinked emulsion polymerized elastomeric polymers. No mention is made of grafting agent.

U.S. Pat. No. 4,404,325 granted Sept. 13, 1983 to Mason et al, discloses blends of 46-94 weight % polyamide, 5-44 weight % ionomer, and 1-12 weight % of ethylene/ester copolymer. The ethylene/ester copolymer does not contain epoxides, isocyanate, aziridine, silanes such as alkoxy or alkyl silanes, alkylating agents such as alkyl halides or alpha-halo ketones or aldehydes or oxazoline reactive groups, and therefore, Mason's ethylene/ester copolymer does not graft to the polyamide or the acid-containing ethylene copolymer as in the present invention.

U.S. Pat. No. 4,346,194 granted Aug. 24, 1982 to Roura discloses binary blends of 60-97 weight % polyamide and 3-40 weight % of a polymeric toughening agent which can be either an elastomeric olefinic copolymer having carboxyl(ate) functionality or an ionic copolymer.

PCT Publication No. WO 86/06397 published Nov. 6, 1986 discloses compositions comprising 50-95 weight % polyamide and 5-50 weight to ethylene polymer, where the ethylene polymer is a mixture of ethylene/alkyl(meth)acrylate copolymer (A) and ethylene/maleic anhydride/alkyl(meth)acrylate terpolymer (B), the ratio of A:B ranges from $\frac{1}{3}$ to 3. Neither components (A) or (B) contain mono-carboxylic acid functionality or reactive groups selected from those used by applicant.

Japanese patent publication 59/91,148 published May 25, 1984 (abstract cited in Chemical Abstracts #193080m Vol. 101, 1984) discloses a three-component blend of polyamide 100 parts, neutralized ethylene-alpha,beta-unsaturated carboxylic acid copolymer 2-100 parts, and an ethylene-alpha-olefin copolymer 30-100 parts wherein the latter copolymer is modified with dicarboxylic acid or anhydride. As such, this latter component will not react with the acid-containing ethylene copolymer of the present invention.

DISCLOSURE OF THE INVENTION

This invention relates to certain partially grafted flexible thermoplastic compositions which possess a unique combination of unexpectedly superior high temperature properties.

These compositions may be gamma-irradiated or foamed, and also may contain glass, graphite, Kevlar ®, as well as other short-fiber reinforcements, glass beads, glass spheres, aluminum silicate, asbestos, clay, mica, calcium carbonate, barium sulfate, and the like and combinations of such materials. Glass and Kevlar ® fibers and barium sulfate are preferred. In addition, flame retardants, plasticizers, pigments, antioxidants, ultraviolet light and heat stabilizers, carbon black and nucleating agents can be used. These compositions are useful in combination with tackifiers and other appropriate ingredients for use as high temperature adhesives.

The phrase "partially grafted" is meant to indicate that in the compositions of the present invention the grafting agent is the limiting component, i.e., the addition of more grafting agent than is permitted by the definition of this invention would result in further grafting and the creation of an intractable composition. In particular, this invention relates to partially grafted flexible thermoplastic compositions derived from a variety of thermoplastics and ethylene copolymers containing an acid moiety.

It is generally not advantageous to have more moles of reactive groups from the polymeric grafting agent in the blend than moles of acid groups from the acid-containing copolymer; i.e., one does not want a molar excess of reactive groups in the grafting agent. If an excess of reactive groups from the grafting agent is present, the grafting agent may react with itself resulting in materials with inferior properties.

More specifically, the compositions of the present invention comprise partially grafted flexible thermoplastic compositions formed by melt blending under high shear the following components:

a) 25-50 volume % of at least one thermoplastic resin having available graft sites, the thermoplastic having a number average molecular weight of at least 5,000, b) 10-74 volume % of at least one ethylene copolymer, E/X/Y, where E is ethylene at least 50 weight %, X is from 1-35 weight % of an acid-containing unsaturated mono-carboxylic acid, and Y is from 0-49 weight % of a moiety derived from at least one alkyl acrylate, alkyl methacrylate, alkyl vinyl ether, carbon monoxide, sulfur dioxide, or mixtures thereof where the alkyl groups contain 1-12 carbon atoms, and further wherein the acid groups in the acid-containing moiety are neutralized from 0-100% by a metal ion, and c) 1-50 volume % of at least one polymeric grafting agent which contains reactive groups selected from at least one of epoxides, isocyanates, aziridine, silanes such as alkoxy or halo silanes, alkylating agents such as alkyl halides or alpha-halo ketones or aldehydes, or oxazoline, that react with the acid-containing moieties in component b) and that additionally react with the reactive graft sites of component a) and wherein the quantity of reactive groups, x, provided to the composition by the grafting agent expressed as MMOLS of reactive groups per one hundred grams of component b plus component c is defined by the following formula:

$$d - (a) \cdot (m) < x < 16$$

where,
a = volume % of component a
d = 0.9 MMOLS of reactive groups per one hundred grams of component b plus component c $$m = 0.016 \frac{\text{MMOLS of reactive groups}}{\text{Volume \% of component a}} \frac{100 \text{ g of component b + component c}}{}$$

and further wherein the weight percent of the monomer(s) containing the reactive groups is 0.5-15 weight percent of the polymeric grafting agent, component c. The remainder of the polymeric grafting agent contains at least 50 weight % of ethylene and from 0-49 weight % of a moiety derived from at least one alkyl, acrylate, alkyl methacrylate, alkyl vinyl ether, carbon monoxide, sulfur dioxide, or mixtures thereof where the alkyl groups contain 1-12 carbon atoms.

The above percentages are based on the total of component a, component b, and component c only and are calculated from the densities of the individual components prior to mixing.

Preferred compositions of the present invention comprise partially grafted flexible thermoplastic compositions formed by melt blending under high shear:

a) 27-48 volume % of at least one thermoplastic resin having available graft sites, the thermoplastic having a number average molecular weight of at least 7,500; and being selected from polyamides, co-polyamides, polyesters, co-polyesters, or polycarbonates b) 20-69 volume % of at least one ethylene copolymer, E/X/Y, where E is ethylene at least 55 weight %, X of the copolymer is from 3-30 weight % of an unsaturated mono-carboxylic acid and Y is from 0-35 weight % of a moiety derived from at least one alkyl acrylate, alkyl methacrylate, or mixtures thereof where the alkyl groups contain 1-8 carbon atoms and further wherein the acid groups in the unsaturated mono-carboxylic acid are neutralized from 0-80% by at least one metal ion selected from the group consisting of sodium, zinc, magnesium, calcium, potassium, and lithium; and c) 4-35 volume % of at least one polymeric grafting agent which contains reactive groups selected from epoxides derived from unsaturated monomers containing from 4 to 11 carbon atoms that react with the acid-containing moieties in component b and that additionally react with the reactive graft sites of component a and wherein the quantity of reactive groups, x, provided to the composition by the grafting agent expressed as MMOLS of reactive groups per one hundred grams of component b plus component c is defined by the following formula:

$$d-(a)\cdot(m)<x<10$$

where,
a = volume % of component a
d = 1.8 MMOLS of reactive groups per one hundred grams of component b plus component c $$m = 0.03 \left[ \frac{\text{MMOLS of reactive groups}}{100 \text{ g of component b + component c}} \cdot \frac{1}{\text{Volume \% of component a}} \right]$$

and further wherein the weight percent of the monomer(s) containing the reactive groups is 1-10 weight percent of the polymeric grafting agent, component c. The remainder of the polymeric grafting agent contains at least 55 weight% of ethylene and from 0-35 weight % of a moiety derived from at least one alkyl acrylate, alkyl methacrylate or mixtures thereof where the alkyl group contains 1-8 carbon atoms.

Most preferred compositions of the present invention comprise partially grafted flexible thermoplastic compositions formed by melt blending under high shear:

a) 28-46 volume % of at least one thermoplastic resin having available graft sites, the thermoplastic having a number average molecular weight of at least 10,000; and being selected from polyamides, polyesters, or co-polyesters, b) 30-65 volume % of at least one ethylene copolymer, E/X/Y, where E is ethylene at least 60 weight %, X of the copolymer is from 5-15 weight % of an acid-containing moiety selected from methacrylic or acrylic acid, and Y of the copolymer is from 0-25 weight % of methyl acrylate, iso-butyl acrylate, or n-butyl acrylate, and further wherein the acid groups are neutralized from 30-70% by at least one metal ion selected from sodium, zinc, magnesium, or calcium ions and;

c) 7-25 volume % of a least one polymeric grafting agent which contains reactive groups selected from epoxides derived from glycidyl methacrylate or glycidyl acrylate that react with the acid-containing moieties in component b and that additionally react with the reactive graft sites of component a and wherein the quantity of reactive groups, x, provided to the composition by the grafting agent expressed as MMOLS of reactive groups per one hundred grams of component b plus component c is defined by the following formula:

$$d-(a)\cdot(m)<x<5$$

where
a = volume % of component a
d = 3.6 MMOLS of reactive groups per one hundred grams of component b plus component c $$m = 0.06 \left[ \frac{\text{MMOLS of reactive groups}}{100 \text{ g of component b + component c}} \cdot \frac{1}{\text{Volume \% of component a}} \right]$$

and further wherein the weight percent of the monomer(s) containing the reactive groups is 1-7 weight percent of the polymeric grafting agent, component c. The remainder of the polymeric grafting agent contains at least 60 weight % of ethylene and from 0-25 weight % of methyl acrylate, iso-butyl acrylate or n-butyl acrylate.

The components described above are melt blended with each other under high shear. The various ingredients may first be combined with one another in what is commonly referred to as a "salt and pepper" blend, i.e., a pellet blend, of each of the ingredients, or they may be combined with one another via simultaneous or separate metering of the various components, or they may be divided and blended in one or more passes into one or more sections of mixing equipment such as an extruder, Banbury, Buess Kneader, Ferrell continuous mixer, or other mixing equipment. For example, one can use an extruder with two or more feed zones into which one or more of the ingredients may be added sequentially. In this case, it is sometimes advantageous that the thermoplastic and polymeric grafting component be combined first, then the acid-containing copolymer be added downstream. This helps promote the grafting reaction(s) between the thermoplastic and polymeric grafting components, prior to the reaction(s) between the polymeric grafting component and acid-containing copolymer. However, the order of addition does not have any effect on the high temperature properties described by this invention. The high shear insures proper dispersion of all the components such as would be necessary to carry out the grafting reaction. In addition, sufficient mixing is essential to achieve the morphology which is necessary in the compositions of the present invention. The morphology required for the compositions of the present invention is that at least one of continuous phases must be the thermoplastic; i.e., component a. Note that the thermoplastic, component a, is at least one of the continuous phases in all of the compositions of the present invention even though the thermoplastic, component a, comprises less, and in fact, in many cases substantially less than 50 volume %.

Polyamide resins suitable for use in the current invention include those described by U.S. Pat. No. 4,174,358 of Epstein and U.S. Pat. No. 4,338,413 and patents incorporated therein including U.S. Pat. Nos. 2,071,250, 2,071,251, 2,130,523, 2,130,948, 2,241,322, 2,312,966, 2,512,606 and 3,393,210.

In addition, polyether block amides consisting of a linear and regular chain of rigid polyamide segments and flexible polyether segments. The generalized chemical formula for these is:

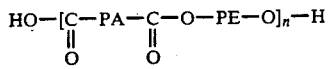

where PA represents the polyamide segment and PE represents the polyether segment.

Preferred polyamides include nylon 66, nylon 6, nylon 612, nylon 11, nylon 12, nylon 1212, amorphous nylons, nylon 666 and polyether block amides.

Most preferred polyamides include nylon 66, nylon 612 and nylon 6.

Polyester resins suitable for use in the current invention include those described in U.S. Pat. No. 4,172,859 of Epstein and PCT publication No. WO 85/03718. In addition, copolyetherester polymers such as those described in U.S. Pat. No. 4,221,703 of Hoeschele, and poly(etherimide esters) such as described by U.S. Pat. No. 4,556,705 of McCready. In addition, aromatic polyesters that are prepared from various ratios of iso-and terephthalic acids with bisphenol A can be used.

The preferred polyesters include polyethylene terephthalate; poly(1,4-butylene)terephthalate; and 1,4-cyclohexylene dimethyleneterephthalate/isophthalate copolymer and other linear homopolymer esters derived from aromatic dicarboxylic acids, including isophthalic, bibenzoic, napthalene-dicarboxylic including the 1,5-; 2,6-; and 2,7-napthalenedicarboxylic acids; 4,4'-diphenylenedicarboxylic acid; bis(p-carboxyphenyl) methane; ethylene-bis-p-benzoic acid; ethylene bis(p-oxybenzoic) acid; 1,3-trimethylene bis(p-oxybenzoic) acid; and 1,4-tetramethylene bis(p-oxybenzoic) acid, and glycols selected from the group consisting of 2,2-dimethyl-1,3-propane diol; cyclohexane dimethanol and aliphatic glycols of the general formula $HO(CH_2)_nOH$ where n is an integer from 2 to 10, e.g., ethylene glycol; 1,6-hexamethylene glycol;1,8-octamethylene glycol; 1,10-decamethylene glycol; 1,3-propylene glycol; and 1,4-butylene glycol. Up to 20 mole percent, as indicated above, of one or more aliphatic acids, including adipic, sebacic, azelaic, dodecanedioic acid or 1,4-cyclohexanedicarboxylic acid can be present. In addition, the preferred copolyether ester polymers are those prepared from dimethyl terephthalate, 1,4-butanediol, and poly(tetramethylene oxide) glycol having a molecular weight of about 600-2000 or poly(ethylene oxide) glycol having a molecular weight of about 600-1500. Optionally, up to about 30 mole % and preferably 5-20 mole % of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600-1600. Up to 30 mole % and preferable 10-25 mole % of the dimethyl terephthalate can be replaced with dimethyl isophthalate or butanediol can be replaced with neopentyl glycol until up to about 30% and preferably 10-25% of the short chain ester units are derived from neopentyl glycol in these poly(propylene oxide) glycol polymers.

The most preferred polyesters have intrinsic viscosities of 0.5 to about 4.0 at 25° C. using o-chlorophenol as the solvent, and are based on polyethylene terephthalate homopolymers, polybutylene terephthalate homopolymers, polyethylene terephthalate polybutylene terephthalate copolymers, or polybutylene terephthalate block copolymers that contain one or more of the following glycols of 500 to 2500 molecular weight, polyethylene glycol, tetramethylene glycol or polypropylene glycol.

Polycarbonate resins suitable for use in the current invention are described in U.S. Pat. No. 4,172,859 of Epstein and U.S. Pat. No. 2,999,835 of Goldberg.

Suitable ethylene copolymers include ethylene/acrylic acid, ethylene/methacrylic acid, ethylene/acrylic acid/n-butyl acrylate, ethylene/methacrylic acid/n-butyl acrylate, ethylene/methyaorylic acid/iso-butyl acrylate, ethylene/acrylic acid/iso-butyl acrylate,ethylene/methacrylate acid/n-butyl methacrylate, ethylene/acrylic acid/methyl methacrylate, ethylene/acrylic acid/ethyl vinyl ether, ethylene/methacrylic acid/butyl vinyl ether ethylene/acrylic acid/-methyl acrylate, ethylene/methacrylic acid/methyl acrylate, ethylene/methacrylic acid/methyl methacrylate, ethylene/acrylic acid/n-butyl methacrylate, ethylene/methacrylic acid/ethyl vinyl ether and ethylene/acrylic acid/butyl vinyl ether.

Preferred ethylene copolymers that contain a monocarboxylic acid moiety for use in the compositions of the present invention include ethylene/methacrylic acid, ethylene/acrylic acid, ethylene/methacrylic acid/n-butyl acrylate, ethylene/acrylic acid/n-butyl acrylate, ethylene/methacrylic acid/methylacrylate and ethylene/acrylic acid/methylacrylate copolymers. The most preferred ethylene copolymers for use in the compositions of the present invention are ethylene/methacrylic acid, ethylene/acrylic acid copolymers, ethylene/methacrylic acid/n-butyl acrylate and ethylene/methacrylic acid/methylacrylate terpolymers.

The polymeric grafting agent, component c, must be able to react with both component b and component a. These polymeric grafting agents include ethylene copolymers copolymerized with monomers containing one or more reactive moieties said monomers selected from unsaturated epoxides of 4-11 carbon atoms, such as glycidyl acrylate, glycidyl methacrylate, allyl glycidyl ether, vinyl glycidyl ether, and glycidyl itaconate, unsaturated isocyanates of 2-11 carbon atoms, such as vinyl isocyanate and isocyanato-ethyl methylacrylate, aziridine and monomers containing, silanes such as alkoxy or alkyl silanes, alkylating agents such as alkyl halides,or alpha-halo ketones or aldehydes or oxazoline, and the polymeric grafting agent may additionally contain an alkyl acrylate, alkyl methacrylate, carbon monoxide, sulfur dioxide and/or alkyl vinyl ether, where the alkyl groups contain 1-12 carbon atoms.

Preferred polymeric grafting agents for use in the compositions of the present invention include ethylene/glycidyl acrylate, ethylene/n-butyl acrylate/-glycidyl acrylate, ethylene/methylacrylate/glycidyl acrylate, ethylene/glycidyl methacrylate, ethylene/n-butyl acrylate/ glycidyl methacrylate and ethylene/methylacrylate/glycidyl methacrylate copolymers. The most preferred grafting agents for use in the compositions of the present invention are copolymers derived from ethylene/n-butyl acrylate/ glycidyl methacrylate and ethylene/glycidyl methacrylate.

In addition to component a, component b and component c, discussed above, the flexible thermoplastic compositions of the present invention may include other ingredients as are used in the conventional compounding of thermoplastics and/or ethylene copolymers, provided that such additional ingredients are no more than 100 parts by weight per 100 parts of the total of component a plus component b plus component c. Examples of such other ingredients include carbon black, glass fibers, graphite fibers, Kevlar® fibers, glass spheres, plasticizers, lubricants, silica, titanium dioxide, pigments, clay, mica and other mineral fillers, flame retardants, antioxidants, ultraviolet stabilizers, heat stabilizers, processing aids, adhesives and tackifiers.

Specific mention should be made of plasticizers which can be used to extend the hardness range of the compositions of the present invention. Plasticizers can comprise 5-70 parts per hundred of the total polymer in the composition and can be selected to plasticize any one or more phases in these multi-phase blends. For example, if a composition contains 50 parts nylon and 50 parts ethylene copolymer, a nylon compatible plasticizer can be present in an amount of up to 25 parts, and an ethylene copolymer compatible plasticizer can be present in an amount of up to 45 parts giving a total of up to 70 parts of plasticizer in this particular composition. Preferred plasticizers have low volatility, i.e., a boiling point of at least 200° C. Suitable plasticizers include phthalates, adipates, phosphates, glycolates, sulfonamides, trimellitates and epoxidized vegetable oil. Specific examples for the ethylene copolymers (components b and component c) include epoxidized soy bean oil or sunflower oil, dibutyl phthalate, dicyclohexyl phthalate, diethyl phthalate, diisodecyl phthalate, dimethyl phthalate, di(2-ethyl hexyl) phthalate, dialkyl adipate, tributoxyethyl phosphate, triphenyl phosphate, butyl glycolate, di-tridecyl-di-adipate, and mixed C7-C9 alkyl trimellitate. Sulfonamide plasticizers are preferred for nylons. These include N-butyl benzyl sulfonamide, N-cyclohexyl-p-toluene sulfonamide, o,p-toluene sulfonamide, p-toluene sulfonamide and N-ethyl-o,p-toluene sulfonamide.

For plasticizers that are useful for the polyester and co-polyester compositions of the present invention, see for example, U.K. patents 2,015,013 and 2,015,014 and PCT publication number WO 85/03718. Some examples of preferred plasticizers for polyester-based compositions of the present invention include polyethylene glycol 400 bis(2-ethoxyhexanoate), methoxy polyethylene glycol 550 2-ethylhexanoate and tetraethylene glycol bis(2-ethylhexanoate) but not limited to these.

Further, when compositions of the present invention are based on polyethylene terepthalate polyesters, a crystallization promoter may be added.

In the following examples, the various samples were prepared by combining the indicated ingredients in a "salt and pepper" blend, followed by extrusion in a 28 mm twin screw extruder using a high shear screw, except for those formulations containing high levels of plasticizer where injection of the plasticizer into a side port was necessary.

Below are given representative extrusion conditions for a single-feed extrusion in which all ingredients are combined in a "salt and pepper" fashion.

Representative extrusion conditions for the nylon 6 compositions shown in Table IV are:

| Screw speed (rpm) | Zone 1 temp. (°C.) | Zone 2 temp. (°C.) | Zone 3 temp. (°C.) | Zone 4 temp. (°C.) | Zone 5 temp. (°C.) | Die temp. (°C.) |
| --- | --- | --- | --- | --- | --- | --- |
| 185 | 130 | 220 | 250 | 250 | 250 | 225 |

Melt temperature: 270° C.

Representative extrusion conditions for the nylon 66 compositions shown in Tables V-IX are:

| Screw speed (rpm) | Zone 1 temp. (°C.) | Zone 2 temp. (°C.) | Zone 3 temp. (°C.) | Zone 4 temp. (°C.) | Zone 5 temp. (°C.) | Die temp. (°C.) |
| --- | --- | --- | --- | --- | --- | --- |
| 175 | 150 | 230 | 270 | 265 | 260 | 260 |

Melt temperature: 290° C.

Representative extrusion conditions for the nylon 612 compositions shown in Table X are:

| Screw speed (rpm) | Zone 1 temp. (°C.) | Zone 2 temp. (°C.) | Zone 3 temp. (°C.) | Zone 4 temp. (°C.) | Zone 5 temp. (°C.) | Die temp. (°C.) |
| --- | --- | --- | --- | --- | --- | --- |
| 175 | 140 | 225 | 250 | 250 | 250 | 225 |

Melt temperature: 275° C.

Representative extrusion conditions for the nylon 12 compositions shown in Table XI are:

| Screw speed (rpm) | Zone 1 temp. (°C.) | Zone 2 temp. (°C.) | Zone 3 temp. (°C.) | Zone 4 temp. (°C.) | Zone 5 temp. (°C.) | Die temp. (°C.) |
| --- | --- | --- | --- | --- | --- | --- |
| 175 | 140 | 200 | 220 | 220 | 200 | 180 |

Melt temperature: 250° C.

Representative extrusion conditions for the amorphous nylon compositions shown in Table XII are:

| Screw speed (rpm) | Zone 1 temp. (°C.) | Zone 2 temp. (°C.) | Zone 3 temp. (°C.) | Zone 4 temp. (°C.) | Zone 5 temp. (°C.) | Die temp. (°C.) |
| --- | --- | --- | --- | --- | --- | --- |
| 175 | 150 | 225 | 270 | 270 | 260 | 260 |

Melt temperature: 308° C.

Representative extrusion conditions for the polyester and co-polyester compositions shown in Table XIII are:

| Screw speed (rpm) | Zone 1 temp. (°C.) | Zone 2 temp. (°C.) | Zone 3 temp. (°C.) | Zone 4 temp. (°C.) | Zone 5 temp. (°C.) | Die temp. (°C.) |
| --- | --- | --- | --- | --- | --- | --- |
| 175 | 130 | 220 | 240 | 240 | 225 | 225 |

Melt temperature: 260° C.

Representative extrusion conditions for the polycarbonate compositions shown in Table XIV are:

| Screw speed (rpm) | Zone 1 temp. (°C.) | Zone 2 temp. (°C.) | Zone 3 temp. (°C.) | Zone 4 temp. (°C.) | Zone 5 temp. (°C.) | Die temp. (°C.) |
| --- | --- | --- | --- | --- | --- | --- |
| 175 | 150 | 260 | 270 | 270 | 250 | 255 |

Melt temperature: 290° C.

The extruded samples were dried in a vacuum oven at 60° C. for 24 hours, then injection molded into plaques and died out into test specimens for physical property evaluations. Representative molding conditions are as follows:

| Screw type | Screw speed (rpm) | Nozzle diameter | Hopper temp. (°C.) |
|---|---|---|---|
| general purpose | 45–60 | 3.97 mm | ambient |

Representative injection molding temperature profiles used to produce the plaques that were died out into test specimens for physical property evaluations of the nylon 6 compositions that appear in Table IV are:

| Rear temp. (°C.) | Center temp. (°C.) | Front temp. (°C.) | Nozzle temp. (°C.) | Mold temp. (°C.) |
|---|---|---|---|---|
| 250 | 250 | 240 | 240 | 55–65 |

Representative injection molding temperature profiles used to produce the plaques that were died out into test specimens for physical property evaluations of the nylon 66 compositions that appear in Tables V to IX are:

| Rear temp. (°C.) | Center temp. (°C.) | Front temp. (°C.) | Nozzle temp. (°C.) | Mold temp. (°C.) |
|---|---|---|---|---|
| 275 | 275 | 265 | 265 | 55–65 |

Representative injection molding temperature profiles used to produce the plaques that were died out into test specimens for physical property evaluations of the nylon 612 compositions that appear in Table X are:

| Rear temp. (°C.) | Center temp. (°C.) | Front temp. (°C.) | Nozzle temp. (°C.) | Mold temp. (°C.) |
|---|---|---|---|---|
| 250 | 250 | 250 | 240 | 55–65 |

Representative injection molding temperature profiles used to produce the plaques that were died out into test specimens for physical property evaluations of the nylon 12 compositions that appear in Table XI are:

| Rear temp. (°C.) | Center temp. (°C.) | Front temp. (°C.) | Nozzle temp. (°C.) | Mold temp. (°C.) |
|---|---|---|---|---|
| 210 | 230 | 230 | 220 | 45–55 |

Representative injection molding temperature profiles used to produce the plaques that were died out into test specimens for physical property evaluations of the amorphous nylon compositions that appear in Table XII are:

| Rear temp. (°C.) | Center temp. (°C.) | Front temp. (°C.) | Nozzle temp. (°C.) | Mold temp. (°C.) |
|---|---|---|---|---|
| 275 | 275 | 275 | 275 | 30 |

Representative injection molding temperature profiles used to produce the plaques that were died out into test specimens for physical property evaluations of the polyester and co-polyester compositions that appear in Table XIII are:

| Rear temp. (°C.) | Center temp. (°C.) | Front temp. (°C.) | Nozzle temp. (°C.) | Mold temp. (°C.) |
|---|---|---|---|---|
| 230 | 240 | 230 | 230 | 35–45 |

Representative injection molding temperature profiles used to produce the plaques that were died out into test specimens for physical property evaluations of the polycarbonate compositions that appear in Table XIV are:

| Rear temp. (°C.) | Center temp. (°C.) | Front temp. (°C.) | Nozzle temp. (°C.) | Mold temp. (°C.) |
|---|---|---|---|---|
| 270 | 270 | 270 | 270 | 35–45 |

A number of physical properties were measured for each composition. Unless otherwise noted, the samples were prepared and tested as follows. Melt Indices of the ethylene copolymers and the grafting agents were determined according to ASTM D-1238. Tensile properties (elastic modulus, tensile strength and elongation) at room temperature 100° C., 150° C., and 200° C. were measured by ASTM Procedure D-1708. Percent retention of tensile strength at break was calculated from the individual reading taken at the elevated temperature as compared with room temperature readings. All of the samples were dry-as-molded, except for Examples 11 to 16 and Comparative Examples C-7, C-16. Those samples were conditioned in a vacuum oven at 60° C. for 24 hours and were then placed in a room maintained at 23° C. and 50% relative humidity for a minimum of 48 hours. In addition, all of the test specimens were died out at a 45° angle from the machine direction, except Examples 11, 12 and 13. These samples were died out in the machine direction. Samples were also tested for volume swell in ASTM #1 and/or #3 oil at 70° C. and/or 100° C. according to ASTM D-471. All samples for oil swell measurements were ⅛ (3.18mm) thick except where noted in the Tables. Other tests performed include hardness (ASTM D-2240), heat distortion temperature (ASTM D-648), Taber abrasion (ASTM D-1044), Notched Izod (ASTM D-256), the GE scrape abrasion test, and compression set (ASTM D-395). The thermoplastics, grafting agents, ethylene copolymers, and additives used in the Examples are defined in the following Tables (I, IA, II and III).

In the following Examples, all percentages of component a, component b and component c are given by volume. All additives are given in parts per hundred resin (phr) of component a plus component b plus component c, all values originally obtained in British units have been converted to S.I. units and rounded, where appropriate; and finally, blanks in the Tables denote either the absence of a particular component or that a particular test was not run.

TABLE I

| Component A | | |
|---|---|---|
| Code | Identity | Density |
| A | Nylon 6 RV* = 80 approximately 10% residual | 1.13 |

TABLE I-continued

| | Component A | |
|---|---|---|
| Code | Identity | Density |
| | caprolactam monomer | |
| B | Nylon 6 RV* = 36 | 1.13 |
| C | Nylon 66 RV* = 50 | 1.14 |
| D | Nylon 612 IV** = 1.2 | 1.08 |
| E | Nylon 12 MI[1)] = 2.6 @230° C. | 1.01 |
| F | Nylon 12 MI[1)] = 30 @230° C. | 1.01 |
| G | Amorphous nylon (copolymer of hexamethylene diamine, isophthalic acid, terephthalic acid and bis-para-aminocyclohexyl methane) IV** = 0.80 | 1.08 |
| H | Copolyetherester with 60% butylene-terephthalate units, 40% polytetra-methylene ether (1000 Mn) tere-phthalate MI[1)] = 7.5 @220° C. | 1.20 |
| I | Polybutylene terephthalate MI[1)] = 12 @240° C. | 1.34 |
| J | Copolyetherester with 70% butylene-terephthate units, 30% polytetra-methylene ether (1000 Mn) terephalate MI[1)] = 8.5 @230° C. | 1.22 |
| K | Copolyetherester with 63% butylene-terephthate units, 37% polyalkylene ether terephthalate*** MI[1)] = 10 @230° C. | 1.22 |
| L | Polycarbonate Mn~22,000 | 1.20 |

*RV = relative viscosity (measured in formic acid 22 g polymer/100 ml of 90% formic acid viscosity measured in a Brookfield viscometer)
**IV - intrinsic viscosity (measured in meta cresol)
***polyalkylene ether consists of ethylene oxide (EO) capped poly(propylene oxide) having MN~2200.
[1)]2160 g weight

TABLE IA

| | Component B | | | | | | |
|---|---|---|---|---|---|---|---|
| Code | Ethylene (Wt %) | n-Butyl Acrylate (Wt %) | Meth-acrylic Acid (Wt %) | Approx. Degree of Neutral-ization (%) | Ion | Melt Index | Density (g/cc) |
| A | 66.9 | 24.5 | 8.6 | 70 | Zn | 0.5 | .94 |
| B | 66.9 | 24.5 | 8.6 | 40 | Na | 1.1 | .94 |
| C | 85 | 0 | 15 | 29 | Na | 3.9 | .94 |
| D | 85 | 0 | 15 | 58 | Zn | 0.7 | .94 |
| E | 65 | 30 | 5 | 75 | Zn | 1.5 | .94 |
| F | 69 | 0 | 31 | 0 | — | 20 | .94 |
| G | 61 | 35 | 4 | 60 | Zn | 1.5 | .94 |
| H | 90 | 0 | 10 | 54 | Na | 1.3 | .94 |
| I | 90 | 0 | 10 | 71 | Zn | 1.1 | .94 |
| J | 66.9 | 24.5 | 8.6 | 0 | — | 24 | .94 |
| K | 57 | 35* | 8 | 60 | Zn | 0.8 | .94 |
| L | 66.9 | 24.5 | 8.6 | 40 | Zn | 0.8 | .94 |
| M | 62.5 | 27 | 10.5 | 70 | Zn | 0.1 | .94 |
| N | 66.9 | 24.5 | 8.6 | 70 | Zn | 0.1 | .94 |
| O | 66.9 | 24.5 | 8.6 | 50 | Na | 1.0 | .94 |
| P | 69.4 | 22 | 8.6 | 70 | Zn | 0.2 | .94 |

*methyl acrylate

TABLE II

| | Component C | | | | |
|---|---|---|---|---|---|
| Code | Ethylene (Wt. %) | N-Butyl Acrylate (Wt. %) | Glycidyl Methacrylate (Wt. %) | Melt Index (g/10 min) | Density (g/cc) |
| A | 99.0 | — | 1.0 | 26 | .94 |
| B | 67.8 | 28 | 2.0 | 27 | .94 |
| C | 65.5 | 28 | 4.5 | 4 | .94 |
| D | 61.8 | 28 | 8.2 | 4 | .94 |
| E | 98.5 | — | 1.5 | 20 | .94 |
| F | 78.5 | 20 | 1.5 | 5 | .94 |
| G | 68.6 | 26 | 1.4 | 12 | .94 |
| H | 64.9 | 28 | 5.25 | 20 | .94 |
| I | EPDM rubber (68% ethylene/26% propylene/ 6.3% hexadiene/0.13% norbornadiene) grafted with fumaric acid to contain 1.5-2% anhydride, and having a melt index of 1-5 g/10 min. | | | | .91 |

TABLE III

| | ADDITIVES |
|---|---|
| A | tetrakis(methylene(3,5-di-tert-butyl-4-hydroxyhydrocinnamate)methane |
| B | N,N'-hexamethylene-bis-(3,5-di-tert-butyl-4-hydroxy-hydrocinnamamide) |
| C | p-toluenesulfonamide |
| D | zinc stearate |
| E | Di-tridecyl-adipate |
| F | Clay |
| G | Glass Fiber |
| H | 35% Kevlar ® Fiber/65% nylon 66 concentrate |
| I | Zinc acetate |
| J | N-ethyl-o,p-toluenesulfonamide (mixture of ortho and para isomers) |
| K | dioctyl azelate |

Examples 1-5 and Comparative Examples C, C-1, and C1A in Table IV illustrate the compositions of the present invention where the nylon used is nylon 6. In Comparative Example C the volume fraction of the thermoplastic, component a, is 16% and is less than the required minimum of 25 volume%. Therefore, despite the presence of the polymeric grafting agent, component c, insufficient thermoplastic component is present to form a continuous phase, and therefore, the high temperature tensiles and the percent swell in ASTM #3 oil are poor.

In Comparative Example C-1, sufficient thermoplastic, component a, is present, greater than 25 volume%, but the grafting agent, component c, is absent and therefore the thermoplastic, component a, is not the continuous phase. In Comparative Examples C-1A, once again sufficient thermoplastic, component a, is present (greater than 25 volume%) but there is insufficient grafting agent, component c, and/or insufficient shear mixing such that the nylon is not the continuous phase.

The tensile strength of these blends are greatly reduced at 100° C. Comparative Example C-1A has less than 4% retention of its ambient tensile strength at 150° C. The percent swell in ASTM #3 oil for these Comparative Examples is greater than 100 at 70° C. Relative to the Examples, the high temperature tensiles and the percent swell in ASTM #3 oil are poor.

In contrast, when the grafting agent, component c, is present at the appropriate level so that the thermoplastic, component a, is at least one of the continuous phases, there is greatly improved retention of these properties at high temperature. Examples 1–5 illustrate the surprising improvement in properties when the correct level of thermoplastic, component a, and appropriate level of polymeric grafting agent, component c, is present. Retention of tensile strength at break at 150° C. are all greater than 10% and in many cases are substantially greater than 10%. The percent swell in the ASTM #3 oil is also dramatically improved, i.e., reduced. These Examples illustrate that the thermoplastic, component a, must be present in sufficient abundance to form at least one of the continuous phases; that the appropriate level of polymeric grafting agent, component c, is required to facilitate the correct phase relationship of the thermoplastic, component a; and both result in a surprising improvement in the high temperature performance of the materials when these requirements are met.

rial suitable for molding into plaques for further testing. This material was excessively cross-linked, discolored and displayed severe melt fracture during processing. Even when a milder working screw design was used the material exhibited discoloration and sever melt fracture. However, the product was isolated and tested.

Comparative Examples C-A, C-B, and C-C once again show that when the volume percent of the thermoplastic, component a, is less than 25, the required morphology cannot be achieved regardless of the amount of grafting agent, component c, present. As a result, these Comparative Examples all exhibit poor retention of tensile strength at both 100° C. and 150° C. and excessive oil swell.

Comparative Examples C-6, C-8 and C-10 show that when the grafting agent, component c, is absent, the tensile strength of the blends is substantially reduced at high temperatures much more than is the case with comparable compositions containing grafting agent (compare with Examples 6, 8 and 10, respectively). Further, the % swell in oil, especially ASTM #3 oil at 100° C., shows a dramatic improvement (50% better is typical) in the Examples that contain the grafting agent, component c, versus their respective Comparative Examples.

Comparative Example C-9, when viewed together with Example 9, shows that when the volume % of

TABLE IV

EXAMPLES OF COMPOSITIONS WITH NYLON 6

| Expl No. | Comp (a) ID | Vol. % Comp (a) | Comp (b) ID | Vol. % Comp (b) | Comp (c) ID | Vol. % Comp (c) | Quantity Reactive Groups[1] | Additive #1 ID | PHR Additive #1 | Additive #2 ID | PHR Additive #2 | Ten Str Break 23 C MPa | % Elong Break 23 C |
|---|---|---|---|---|---|---|---|---|---|---|---|---|---|
| C | A | 16.4 | N | 78.8 | E | 4.9 | 0.7 | | 0.0 | B | 0.3 | 16.6 | 263 |
| C-1 | A | 26.8 | N | 73.2 | | 0.0 | 0.0 | | 0.0 | B | 0.3 | 19.0 | 305 |
| C-1A | A | 25.4 | M | 69.6 | F | 5.0 | 1.1 | | 0.0 | B | 0.3 | 20.4 | 226 |
| 1 | B | 30.3 | A | 52.0 | G | 17.7 | 2.4 | D | 3.1 | B | 1.0 | 23.6 | 345 |
| 2 | A | 43.1 | N | 51.8 | E | 5.1 | 1.1 | | 0.0 | B | 0.3 | 33.3 | 276 |
| 3 | A | 43.1 | L | 51.8 | E | 5.1 | 1.1 | | 0.0 | B | 0.3 | 19.9 | 153 |
| 4 | A | 43.1 | B | 51.8 | E | 5.1 | 1.5 | | 0.0 | B | 0.3 | 23.2 | 173 |
| 5 | B | 46.4 | A | 36.8 | G | 16.7 | 3.0 | D | 1.0 | B | 1.0 | 28.2 | 310 |

| Expl No. | % Elong Break 100 C | % Elong Break 150 C | % Ret Ten Str @ 100 C | % Ret Ten Str @ 150 C | #3 Oil 70 C/ 70 HR % Swell | #3 Oil 100 C/ 70 HR % Swell | Hardness Shore D | Elastic Modulus 23 C MPa | Elastic Modulus 100 C MPa | Elastic Modulus 150 C MPa | #1 Oil 70 C/ 70 HR % Swell |
|---|---|---|---|---|---|---|---|---|---|---|---|
| C | 388 | | 2.3 | | 134 | | 40 | 35.4 | 0.7 | | 23.6 |
| C-1 | 562 | | 1.2 | | 103 | | 39 | 32.7 | 0.7 | 0.0 | 23.4 |
| C-1A | 162 | 139 | 10.8 | 3.8 | 115 | | 45 | 58.4 | 2.8 | 1.1 | 20.6 |
| 1 | | >220[2] | | >20[2] | | 22.6 | 57 | 247.0 | | 21.0 | |
| 2 | 178 | 178 | 36.2 | 19.9 | 10.2 | | 55 | 367.8 | 23.6 | 13.9 | 2.6 |
| 3 | 104 | 100 | 20.2 | 11.1 | 50.9 | | 50 | 210.9 | 14.4 | 4.2 | 7.2 |
| 4 | 100 | 100 | 32.0 | 11.2 | 34.5 | | 50 | 202.8 | 10.0 | 5.2 | 6.0 |
| 5 | | >250[2] | | >29.3[2] | | 4.2 | 65 | 503.7 | | 35.6 | |

[1] MMOLS reactive groups/100 g (Component b + component c)
[2] Samples pulled out of grips prior to break.

Examples 6–10 and Comparative Examples C-A, C-B, C-C, C-6, C-7, C-8, C-9 and C-10 in Table V illustrate the compositions of the present invention where the nylon is nylon 66. Comparative Example C-7 is an example in which the number of MMOLS of reactive groups per 100 grams of component b plus component c is too high. Even though reasonably good properties are shown in the Table for this example, it was extremely difficult to produce and collect sufficient mategrafting agent, component c, is too great, once again the high temperature properties deteriorate. The composition of Example 9 retains 39% of its tensile strength at 150° C., while that of Comparative Example C-9 retains only 25% of its tensile strength at 150° C. The tensile elongations at break are also much worse than those of Comparative Example C-9. The % swell in ASTM #1 and #3 oils are much worse for Comparative Example 9, relative to Example 9.

TABLE V

EXAMPLES OF COMPOSITIONS WITH NYLON 66 CONTAINING DIFFERENT AMOUNTS OF GRAFTING AGENT

| Expl. | Comp (a) | Vol % Comp | Comp (b) | Vol % Comp | Comp (c) | Vol % Comp | Quantity Reactive | Additive | PHR Add. | Additive |
|---|---|---|---|---|---|---|---|---|---|---|

TABLE V-continued
EXAMPLES OF COMPOSITIONS WITH NYLON 66 CONTAINING DIFFERENT AMOUNTS OF GRAFTING AGENT

| No. | ID | (a) | ID | (b) | ID | (c) | Groups[1] | #1 ID | #1 | #2 ID |
|---|---|---|---|---|---|---|---|---|---|---|
| C-A | C | 17.1 | P | 82.9 |   | 0.0 | 0.0 |   | 0.0 | B |
| C-B | C | 17.1 | P | 77.7 | G | 5.2 | 0.6 |   | 0.0 | B |
| C-C | C | 8.2 | P | 88.9 | A | 2.9 | 0.2 |   |   | B |
| 6 | C | 26.1 | P | 68.6 | G | 5.3 | 0.7 |   | 0.0 | B |
| C-6 | C | 26.1 | P | 73.9 |   | 0.0 | 0.0 |   | 0.0 | B |
| 7 | C | 26.1 | A | 52.8 | G | 21.0 | 2.8 | D | 1.0 | B |
| C-7 | C | 26.1 | P | 47.5 | D | 26.4 | 20.6 |   | 0.0 | B |
| 8 | C | 35.5 | P | 59.2 | G | 5.4 | 0.8 |   | 0.0 | B |
| C-8 | C | 35.5 | P | 64.5 |   | 0.0 | 0.0 |   | 0.0 | B |
| 9 | C | 36.7 | A | 13.3 | G | 50.0 | 7.6 | D | 2.1 | B |
| C-9 | C | 36.7 | A | 2.2 | G | 61.1 | 9.2 | D | 2.1 | B |
| 10 | C | 45.2 | P | 49.3 | G | 5.5 | 1.0 |   | 0.0 | B |
| C-10 | C | 45.2 | P | 54.8 |   | 0.0 | 0.0 |   | 0.0 | B |

| Expl. No. | PHR Additive #2 | Ten Str Break 23 C MPa | % Elong. Break 23 C | % Elong Break 100 C | % Elong Break 150 C | % Ret Ten Str @100 C | % Ret Ten Str @150 C | #3 Oil 100 C % Swell | Hardness Shore D |
|---|---|---|---|---|---|---|---|---|---|
| C-A | 0.3 | 19.6 | 335 | 508 | 268 | 2.5 | 1.5 | 216 | 45 |
| C-B | 0.3 | 17.7 | 244 | 224 | 145 | 5.6 | 3.8 | 197 | 45 |
| C-C | 0.3 | 14.0 | 127 | 260 | 304 | 5.7 | 2.9 |   |   |
| 6 | 0.3 | 22.2 | 233 | 118 | 83 | 12.4 | 9.3 | 128 | 53 |
| C-6 | 0.3 | 20.3 | 255 | 168 | 116 | 6.5 | 3.2 | 153 | 52 |
| 7 | 0.6 | 23.2 | 282 |   | 148 |   | 23.7 | 57 | 48 |
| C-7 | 0.3 | 19.7 | 158 | 146 | 135 | 47.1 | 38.1 | 49 | 65 |
| 8 | 0.3 | 30.7 | 277 | 181 | 162 | 36.2 | 26.3 | 20 | 65 |
| C-8 | 0.3 | 27.3 | 235 | 115 | 86 | 22.3 | 15.3 | 49 | 61 |
| 9 | 1.0 | 18.7 | 69 | 85 | 93 | 42.9 | 39.2 | 49[2] | 55 |
| C-9 | 1.0 | 13.6 | 38 | 57 | 59 | 23.4 | 25.3 | 73[2] | 70 |
| 10 | 0.3 | 35.3 | 270 | 217 | 205 | 48.6 | 34.7 | 4 | 70 |
| C-10 | 0.3 | 32.7 | 256 | 174 | 157 | 40.7 | 28.8 | 8 | 70 |

| Expl. No. | Elastic Modulus 23 C MPa | Elastic Modulus 100 C MPa | Elastic Modulus 150 C MPa | #1 Oil 70 C/70 HR % Swell | #1 Oil 100 C/70 HR % Swell | #3 Oil 70 C/70 HR % Swell |
|---|---|---|---|---|---|---|
| C-A | 33.1 | 0.7 | 0.8 | 23.8 | 46.0 | 151.6 |
| C-B | 44.4 | 1.0 | 1.0 | 25.5 | 55.4 | 145.8 |
| C-C | 44.0 | 1.2 | 0.2 | 34.1 |   | 171.0 |
| 6 | 93.4 | 9.5 | 3.9 | 16.2 | 38.4 | 85.5 |
| C-6 | 56.0 | 1.7 | 1.0 | 16.5 | 37.8 | 101.7 |
| 7 | 139.0 |   | 10.4 | 9.5 | 13.6 | 29.4 |
| C-7 | 87.6 | 32.4 | 11.6 |   | 15.0 |   |
| 8 | 263.3 | 27.9 | 27.0 | 3.8 | 5.4 | 13.3 |
| C-8 | 162.0 | 13.2 | 16.3 | 5.8 | 10.6 | 21.5 |
| 9 | 256.9 | 33.6 | 28.7 | 10.3[2] | 20.1[2] | 36.3[2] |
| C-9 | 204.0 | 22.1 | 15.9 | 57.4[2] | 60.5[2] | 83.3[2] |
| 10 | 526.6 | 59.8 | 47.4 | 1.0 | 1.9 | 3.9 |
| C-10 | 377.8 | 32.2 | 36.4 | 1.8 | 4.1 | 4.7 |

[1] MMOLS reactive groups/100 g (component b + component c)
[2] 1/16" thick specimen Examples 11–46 in Table VI further illustrate the compositions of the present invention using nylon 66. Example 15 and Comparative Examples C-15 and C-15A show that a polymer which is not capable of reacting with both component a and component b is substituted for component c, the tensile properties at 150° C. and the volume swell in ASTM #3 oil at 100° C. are reduced.

The remaining Examples put forth in Table VI demonstrate the breadth of the invention insofar as the compositional ranges of the three polymeric components, and the parameter used to describe the breadth on the degree of grafting (MMOLS reactive groups/100g (component b+component c)). The nylon 66 component spans from about 25 to 50 volume percent in the Examples. The acid copolymer, component b, spans from about 2 to 69 volume percent in the various Examples and Comparative Examples. In addition, acid copolymers of diverse composition are exemplified, with methacrylic acid comonomer content, for example, ranging from about 4 to 31 weight percent in the polymer backbone. The acid copolymer, component b, is also varied in the various Examples by incorporation of a second comonomer, ranging from about 0 to 35 weight percent of n-butyl acrylate and methyl acrylate. The grafting agent, component c, is exemplified from about 1 to 61 volume percent. The quantity of reactive groups expressed as MMOLS reactive groups per one hundred grams of component b plus component c is exemplified from between 0.1 to 33.0.

TABLE VI
EXAMPLES OF COMPOSITIONS WITH NYLON 66

| Expl No. | Comp (a) ID | Vol. % Comp (a) | Comp (b) ID | Vol. % Comp (b) | Comp (c) ID | Vol. % Comp (c) | Quantity Reactive Groups[1] | Additive #1 ID | PHR Additive #1 | Additive #2 ID | PHR Additive #2 | Ten Str Break 23 C MPa | % Elong Break 23 C |
|---|---|---|---|---|---|---|---|---|---|---|---|---|---|
| 11 | C | 44.7 | P | 54.2 | A | 1.1 | 0.1 |   | 0.0 | A | 0.3 | 45.3 | 193 |

TABLE VI-continued
EXAMPLES OF COMPOSITIONS WITH NYLON 66

| Expl No. | | | | | | | | | | | | | | |
|---|---|---|---|---|---|---|---|---|---|---|---|---|---|---|
| 12 | C | 42.8 | P | 52.0 | B | 5.2 | 0.9 | | 0.0 | A | 0.3 | 36.8 | 199 |
| 13 | C | 26.1 | P | 58.1 | C | 15.8 | 6.8 | | 0.0 | B | 0.3 | 19.1 | 158 |
| 14 | C | 26.1 | P | 68.6 | C | 5.3 | 2.3 | | 0.0 | B | 0.3 | 24.4 | 241 |
| 15 | C | 45.2 | P | 27.4 | B | 27.4 | 7.0 | | 0.0 | B | 0.3 | 27.5 | 209 |
| C-15 | C | 45.2 | A | 27.4 | I | 27.4 | 0.0 | | 0.0 | B | 0.3 | 25.5 | 219 |
| C-15a | C | 43.8 | P | 53.0 | I | 3.2 | 0.8 | | 0.0 | A | 0.3 | 38.4 | 173 |
| 16 | C | 35.5 | C | 53.8 | G | 10.7 | 1.6 | D | 1.0 | B | 0.6 | 37.6 | 274 |
| 17 | C | 35.5 | H | 53.8 | G | 10.7 | 1.6 | D | 1.0 | B | 0.6 | 34.8 | 274 |
| 18 | C | 35.5 | D | 53.8 | G | 10.7 | 1.6 | D | 1.0 | B | 0.6 | 38.3 | 270 |
| 19 | C | 35.5 | I | 53.8 | G | 10.7 | 1.6 | D | 1.0 | B | 0.6 | 37.8 | 287 |
| 20 | C | 36.7 | A | 35.6 | G | 27.8 | 4.2 | D | 2.1 | B | 1.0 | 27.7 | 223 |
| 21 | C | 33.0 | A | 32.0 | G | 35.0 | 5.5 | D | 1.9 | B | 0.9 | 24.7 | 169 |
| 22 | C | 36.7 | A | 35.6 | H | 27.8 | 15.3 | D | 2.1 | B | 1.0 | 34.2 | 220 |
| 23 | C | 36.7 | A | 57.8 | D | 5.6 | 4.9 | D | 2.1 | B | 1.0 | 35.0 | 279 |
| 24 | C | 36.7 | A | 57.8 | H | 5.6 | 3.1 | D | 2.1 | B | 1.0 | 36.2 | 288 |
| 25 | C | 26.7 | A | 24.8 | G | 48.5 | 6.4 | D | 1.0 | B | 1.0 | 16.8 | 119 |
| 26 | C | 32.1 | A | 45.6 | H | 22.3 | 11.3 | D | 3.1 | B | 1.0 | 25.0 | 199 |
| 27 | C | 36.7 | A | 52.2 | G | 11.1 | 1.3 | D | 2.1 | B | 1.0 | 30.5 | 282 |
| 28 | C | 36.7 | K | 52.2 | G | 11.1 | 1.3 | D | 2.1 | B | 1.0 | 32.3 | 212 |
| 29 | C | 36.7 | G | 52.2 | G | 11.1 | 1.3 | D | 2.1 | B | 1.0 | 20.9 | 128 |
| 30 | C | 26.1 | D | 63.4 | G | 10.5 | 1.4 | D | 1.0 | B | 0.6 | 36.8 | 254 |
| 31 | C | 26.1 | I | 63.4 | G | 10.5 | 1.4 | D | 1.0 | B | 0.6 | 34.8 | 282 |
| 32 | C | 34.3 | D | 60.8 | H | 4.9 | 2.5 | D | 2.1 | B | 1.0 | 41.1 | 301 |
| 33 | C | 33.7 | D | 38.7 | G | 27.6 | 4.0 | D | 2.1 | B | 1.0 | 28.6 | 229 |
| 34 | C | 43.7 | F | 43.9 | G | 12.4 | 2.1 | D | 2.1 | B | 1.0 | 30.0 | 86 |
| 35 | C | 30.2 | E | 52.1 | G | 17.7 | 2.4 | D | 3.1 | B | 1.0 | 17.4 | 197 |
| 36 | C | 46.2 | E | 37.0 | G | 16.8 | 3.0 | D | 1.0 | B | 1.0 | 25.4 | 127 |
| 37 | C | 30.2 | J | 52.1 | G | 17.7 | 2.4 | D | 3.1 | B | 1.0 | 16.0 | 131 |
| 38 | C | 30.2 | A | 52.1 | G | 27.7 | 2.4 | D | 3.1 | B | 1.0 | 20.8 | 234 |
| 39 | C | 36.7 | E | 52.2 | G | 11.1 | 1.7 | D | 2.1 | B | 1.0 | 24.5 | 229 |
| 40 | C | 32.1 | A | 50.1 | E | 17.8 | 2.5 | D | 3.1 | B | 1.0 | 28.2 | 266 |
| 41 | C | 46.2 | A | 37.0 | E | 16.8 | 3.0 | D | 1.0 | B | 1.0 | 39.2 | 285 |
| 42 | C | 32.1 | A | 62.3 | H | 5.6 | 2.8 | D | 3.1 | B | 1.0 | 30.0 | 270 |
| 43 | C | 32.1 | E | 62.3 | H | 5.6 | 2.8 | D | 3.1 | B | 1.0 | 23.0 | 233 |
| 44 | C | 32.1 | E | 56.8 | H | 11.1 | 5.5 | D | 3.1 | B | 1.0 | 25.1 | 187 |
| 45 | C | 32.1 | E | 51.2 | H | 16.7 | 8.3 | D | 3.1 | B | 1.0 | 25.0 | 236 |
| 46 | C | 36.7 | A | 57.8 | D | 5.6 | 4.9 | D | 2.1 | B | 1.0 | 24.2 | 203 |
| C-46 | C | 36.7 | A | 2.2 | G | 61.1 | 9.2 | D | 2.1 | B | 1.0 | 13.0 | 35 |
| C-46A | C | 36.7 | A | 2.2 | H | 61.1 | 33.0 | D | 2.1 | B | 1.0 | 8.5 | 51 |

| Expl No. | % Elong Break 100 C | % Elong Break 150 C | % Ret Ten Str @ 100 C | % Ret Ten Str @ 150 C | #3 Oil 70 C/ 70 HR % Swell | #3 Oil 100 C/ 70 HR % Swell | Hardness Shore D | Elastic Modulus 23 C MPa | Elastic Modulus 100 C MPa | Elastic Modulus 150 C MPa | #1 Oil 70 C/ 70 HR % Swell | #1 Oil 100 C/ 70 HR % Swell |
|---|---|---|---|---|---|---|---|---|---|---|---|---|
| 11 | | | | | | | | 40.0 | | | | |
| 12 | 165 | 149 | 42.2 | 25.3 | | | | 318.5 | 58.6 | 36.3 | | |
| 13 | 164 | 138 | 44.3 | 31.6 | | 47.0 | 50 | 131.0 | 27.6 | 10.3 | | 11.0 |
| 14 | 143 | 140 | 25.0 | 17.8 | | 68.0 | 51 | 102.5 | 24.2 | 6.8 | | 20.0 |
| 15 | 193 | 208 | 52.7 | 40.2 | | 8.0 | 59 | 339.2 | 69.7 | 32.5 | | 2.0 |
| C-15 | 125 | 133 | 35.3 | 27.0 | | 34.0 | 56 | 181.5 | 51.8 | 16.3 | | 13.0 |
| C-15a | 165 | 158 | 59.4 | 22.9 | 10.4 | | | 184.0 | 64.3 | 25.9 | 1.1 | |
| 16 | 135 | 106 | 24.9 | 16.3 | 3.6 | | 67 | 360.8 | 30.2 | 26.8 | 1.4 | |
| 17 | 147 | 163 | 29.5 | 21.0 | 3.0 | | 65 | 377.8 | 35.6 | 28.7 | 1.3 | |
| 18 | 216 | 220 | 33.5 | 23.4 | 2.6 | | 69 | 277.0 | 48.4 | 38.4 | 0.7 | |
| 19 | 163 | 183 | 29.7 | 21.7 | 2.5 | | 67 | 289.4 | 39.8 | 35.1 | 1.5 | |
| 20 | 195 | 212 | 42.4 | 37.7 | $7.9^2$ | $20.5^2$ | 65 | 408.0 | 37.8 | 35.1 | $0.9^2$ | $2.1^2$ |
| 21 | 149 | 167 | 43.4 | 43.4 | $10.0^2$ | $20.5^2$ | 65 | 336.2 | 37.8 | 36.3 | $1.7^2$ | $4.1^2$ |
| 22 | 215 | 167 | 37.4 | 39.4 | $13.4^2$ | $33.1^2$ | 63 | 225.1 | 36.8 | 26.0 | $2.4^2$ | $4.9^2$ |
| 23 | 180 | 134 | 30.5 | 22.7 | $12.6^2$ | $28.8^2$ | 65 | 268.2 | 27.3 | 27.2 | $1.5^2$ | $4.1^2$ |
| 24 | 160 | 183 | 32.4 | 28.6 | $6.9^2$ | $14.4^2$ | 67 | 289.4 | 43.2 | 30.2 | $0.6^2$ | $2.1^2$ |
| 25 | 83 | 115 | 41.6 | 34.4 | $45.3^2$ | $63.8^2$ | 52 | 55.3 | 21.2 | 14.1 | $10.0^2$ | $21.6^2$ |
| 26 | 144 | 155 | 41.4 | 34.5 | $29.1^2$ | $46.8^2$ | 55 | 59.7 | 23.6 | 18.1 | $5.5^2$ | $11.6^2$ |
| 27 | 194 | 185 | 38.0 | 26.6 | $15.2^2$ | $32.6^2$ | 64 | 302.2 | 33.6 | 28.8 | $3.6^2$ | $7.8^2$ |
| 28 | 166 | 175 | 49.7 | 37.4 | $7.1^2$ | $15.1^2$ | 65 | 251.9 | 42.4 | 31.1 | $1.4^2$ | $3.5^2$ |
| 29 | 75 | 94 | 48.6 | 35.4 | $10.5^2$ | $23.2^2$ | 62 | 251.9 | 42.4 | 33.6 | $1.7^2$ | $4.5^2$ |
| 30 | 172 | 142 | 19.4 | 11.5 | | | 65 | 260.0 | 19.1 | 14.1 | | |
| 31 | 144 | 131 | 20.1 | 12.6 | | | 65 | 236.7 | 17.6 | 13.7 | | |
| 32 | | 198 | | 17.9 | | | 70 | 302.2 | | 30.8 | | |
| 33 | | 124 | | 21.4 | | | 65 | 242.2 | | 27.0 | | |
| 34 | | 87 | | 23.6 | | | 73 | 360.4 | | 26.6 | | |
| 35 | | 156 | | 56.6 | 16.4 | 17.9 | 56 | 164.9 | | 16.8 | 3.6 | 8.2 |
| 36 | | 197 | | 44.6 | 1.8 | 4.7 | 67 | 503.7 | | 37.8 | 0.3 | 0.7 |
| 37 | | 114 | | 33.9 | 35.4 | 65.5 | 51 | 183.7 | | 16.1 | $10.8^2$ | $20.7^2$ |
| 38 | | 126 | | 22.1 | 25.4 | 54.0 | 57 | 153.7 | | 14.1 | 5.2 | 13.7 |
| 39 | | 145 | | 34.5 | $20.5^2$ | $27.8^2$ | 60 | 288.5 | | 35.5 | $7.8^2$ | $8.6^2$ |
| 40 | | 137 | | 23.9 | | $54.8^2$ | 59 | 215.9 | | 20.1 | | $17.1^2$ |
| 41 | | 258 | | 43.1 | | $3.3^2$ | 70 | 377.8 | | 43.2 | | $1.2^2$ |
| 42 | | 145 | | 23.6 | | $39.7^2$ | 59 | 302.2 | | 30.2 | | $13.0^2$ |
| 43 | | 150 | | 31.2 | | $37.1^2$ | 57 | 251.9 | | 24.2 | | $8.9^2$ |
| 44 | | 150 | | 32.2 | | $36.4^2$ | 57 | 215.9 | | 30.2 | | $8.2^2$ |
| 45 | | 154 | | 40.0 | | $34.4^2$ | 57 | 274.8 | | 30.2 | | $6.0^2$ |

TABLE VI-continued
EXAMPLES OF COMPOSITIONS WITH NYLON 66

| | | | | |
|---|---|---|---|---|
| 46 | 86 | 21.4 | 55 | 145.9 |
| C-46 | 86 | 21.4 | 55 | 146.9 |
| C-46A | 53 | 24.5 | 45 | 72.9 |

[1]MMOLS reactive groups/100 g (component b + component c)
[2]1/16" thick specimens Examples 47 to 65 of Table VII show that the invention remains effective even when relatively large amounts of plasticizer and clay filler are included in the blend. These examples include plasticizers that are commonly employed to plasticize polyamides, or ethylene copolymers, or combinations of both types of plasticizers used simultaneously. It demonstrates the extraordinary versatility of the invention, in that each phase of this multi-phase blend may be separately or simultaneously altered by the use of plasticizers and fillers, while maintaining the retention of properties at high temperature.

TABLE VII
EXAMPLES OF COMPOSITIONS WITH PLASTICIZERS FOR NYLON 66 AND/OR ETHYLENE COPOLYMERS

| Expl. No. | Comp. (a) ID | Vol. % Comp. (a) | Comp. (b) ID | Vol. % Comp. (b) | Comp. (c) ID | Vol. % Comp. (c) | Quantity Reactive Groups[1] | Additive #1 ID | PHR Additive #1 | Additive #2 ID | PHR Additive #2 | Additive #3 ID |
|---|---|---|---|---|---|---|---|---|---|---|---|---|
| 47 | C | 30.2 | A | 52.1 | G | 17.7 | 2.4 | D | 3.1 | B | 1.0 | |
| 48 | C | 30.2 | A | 52.1 | G | 17.7 | 2.4 | D | 3.1 | B | 1.0 | |
| 49 | C | 30.2 | A | 52.1 | G | 17.7 | 2.4 | D | 3.1 | B | 1.0 | |
| 50 | C | 36.7 | A | 52.2 | G | 11.1 | 1.7 | D | 2.1 | B | 1.0 | |
| 51 | C | 36.7 | A | 52.2 | G | 11.1 | 1.7 | D | 2.1 | B | 1.0 | |
| 52 | C | 36.7 | A | 52.2 | G | 11.1 | 1.7 | D | 2.1 | B | 1.0 | |
| 53 | C | 46.2 | A | 37.0 | G | 16.8 | 3.0 | D | 1.0 | B | 1.0 | |
| 54 | C | 46.2 | A | 37.0 | G | 16.8 | 3.0 | D | 1.0 | B | 1.0 | |
| 55 | C | 46.2 | A | 37.0 | G | 16.8 | 3.0 | D | 1.0 | B | 1.0 | |
| 56 | C | 35.9 | A | 47.8 | G | 16.3 | 2.5 | | 0.0 | B | 1.0 | |
| 57 | C | 36.0 | A | 47.7 | H | 16.3 | 8.9 | | 0.0 | B | 1.1 | |
| 58 | C | 35.9 | A | 47.8 | G | 16.3 | 2.5 | | 0.0 | B | 1.0 | F |
| 59 | C | 35.9 | A | 47.8 | G | 16.3 | 2.5 | | 0.0 | B | 1.0 | F |
| 60 | C | 35.9 | A | 47.8 | G | 16.3 | 2.5 | | 0.0 | B | 1.0 | F |
| 61 | C | 35.9 | A | 47.8 | G | 16.3 | 2.5 | | 0.0 | B | 1.0 | F |
| 62 | C | 35.9 | A | 47.8 | G | 16.3 | 2.5 | | 0.0 | B | 1.0 | F |
| 63 | C | 26.1 | N | 55.0 | G | 18.9 | 2.5 | | | B | 0.6 | |
| 64 | C | 35.5 | P | 53.7 | G | 10.8 | 1.6 | | | B | 0.9 | |
| 65 | C | 45.1 | P | 49.3 | G | 5.6 | 0.9 | | | B | 0.9 | |

| Expl. No. | PHR Additive #3 | Plasticizer #1 ID | PHR Plasticizer #1 | Plasticizer #2 ID | PHR Plasticizer #2 | Ten Str Break 23 C MPa | % Elong Break 23 C | % Elong Break 150 C | % Ret Ten @150 C | #3 Oil 100 C/ 70 HR % Swell |
|---|---|---|---|---|---|---|---|---|---|---|
| 47 | 0.0 | C | 0.0 | | 0.0 | 26.7 | 325 | 163 | 24.3 | 42.4[2] |
| 48 | 0.0 | C | 3.1 | | 0.0 | 27.4 | 317 | 186 | 24.6 | 40.5[2] |
| 49 | 0.0 | C | 6.2 | | 0.0 | 26.7 | 360 | 211 | 22.9 | 33.6[2] |
| 50 | 0.0 | C | 0.0 | | 0.0 | 31.9 | 329 | 181 | 28.6 | |
| 51 | 0.0 | C | 3.7 | | 0.0 | 30.2 | 314 | 203 | 30.3 | |
| 52 | 0.0 | C | 7.4 | | 0.0 | 31.1 | 351 | 218 | 27.5 | |
| 53 | 0.0 | C | 0.0 | | 0.0 | 31.7 | 252 | 194 | 38.7 | 4.6[2] |
| 54 | 0.0 | C | 9.2 | | 0.0 | 34.6 | 301 | 261 | 39.4 | 4.3[2] |
| 55 | 0.0 | C | 18.4 | | 0.0 | 33.1 | 327 | 262 | 33.3 | 2.9[2] |
| 56 | 0.0 | E | 10.1 | | 0.0 | 17.6 | 148 | 109 | 28.4 | 46.5[2] |
| 57 | 0.0 | E | 40.0 | | 0.0 | 12.4 | 110 | 70 | 39.7 | 21.8[2] |
| 58 | 15.0 | E | 25.0 | C | 5.0 | 13.6 | 126 | 98 | 27.9 | 38.8[2] |
| 59 | 15.0 | E | 25.0 | C | 10.0 | 11.6 | 118 | 96 | 26.1 | 44.7[2] |
| 60 | 15.0 | E | 10.0 | C | 15.0 | 21.6 | 284 | 228 | 28.8 | 16.7[2] |
| 61 | 30.0 | E | 20.0 | C | 25.0 | 13.5 | 153 | 121 | 17.7 | 27.7[2] |
| 62 | 45.0 | E | 30.0 | C | 15.0 | 11.6 | 98 | 114 | 24.6 | 40.3[2] |
| 63 | | K | 10.0 | | | 20.2 | 306 | 165 | 21.8 | |
| 64 | | K | 16.0 | | | 26.2 | 382 | 241 | 26.0 | |
| 65 | | K | 16.0 | | | 29.4 | 339 | 232 | 31.6 | |

| Expl. No. | Hardness Shore D | Elastic Modulus 23 C MPa | Elastic Modulus 150 C MPa | #1 Oil 100 C/70 HR % Swell | % Elong Break 100 C | % Ret Ten Str @100 C | Elastic Modulus 100 C MPa | #1 Oil 70 C/70 HR % Swell | #3 Oil 70 C/70 HR % Swell |
|---|---|---|---|---|---|---|---|---|---|
| 47 | 55 | 181.5 | 25.2 | | | | | | |
| 48 | 56 | 211.1 | 18.9 | | | | | | |
| 49 | 55 | 151.5 | 17.8 | | | | | | |
| 50 | 59 | 314.9 | 27.5 | | | | | | |
| 51 | 61 | 372.9 | 27.7 | | | | | | |
| 52 | 60 | 246.8 | 25.2 | | | | | | |
| 53 | 67 | 476.0 | 50.4 | | | | | | |
| 54 | 68 | 445.5 | 44.9 | | | | | | |
| 55 | 66 | 287.8 | 33.6 | | | | | | |
| 56 | 52 | 100.9 | 31.0 | 10.9[2] | | | | | |
| 57 | 42 | | | | | | | | |

TABLE VII-continued
EXAMPLES OF COMPOSITIONS WITH PLASTICIZERS FOR NYLON 66 AND/OR ETHYLENE COPOLYMERS

| | | | | | | | | | |
|---|---|---|---|---|---|---|---|---|---|
| 58 | 48 | 97.6 | 9.5 | 7.9[2] | | | | | |
| 59 | 46 | 72.9 | 6.5 | 8.7[2] | | | | | |
| 60 | 54 | 139.0 | 15.9 | 0.7[2] | | | | | |
| 61 | 52 | 104.3 | 8.3 | 4.5[2] | | | | | |
| 62 | 47 | 74.0 | 5.1 | 12.6[2] | | | | | |
| 63 | | 73.0 | 7.7 | | 191 | 25.6 | 8.8 | 5.0[2] | 28.6[2] |
| 64 | | 142.0 | 15.4 | | 223 | 34.4 | 25.2 | −0.3[2] | 2.9[2] |
| 65 | | 203.0 | 21.7 | | 244 | 41.5 | 44.5 | −0.4[2] | 0.4[2] |

[1]MMOLS reactive groups/100 g (component b + component c)
[2]1/16" thick specimens The Examples of Table VIII show compositions described by the current invention that have been subjected to gamma-irradiation. Comparative Examples are given of the same samples prior to irradiation, to illustrate the significant and surprising improvement in physical properties. The property improvements are surprising and unexpected in so much as they depend on the exact composition subjected to irradiation. Examples 66 and 67 show a composition that contains 46.2 volume percent of nylon 66 that was subjected to 10 and 20 megarads gamma-irradiation, respectively. At this level of nylon 66, a great improvement was observed in scrape abrasion tests that were performed on wire coated with this material. Most other properties measured remained substantially unaffected. Examples 68 and 68A, that contain 30.2 volume percent of nylon 66, showed significant improvements in several properties. For example, the compression set improved by about 40 percent at 10 and 20 megarads. The #3 oil swell at 150° C. improved by about 26 percent at 20 megarads. While the tensile strength at 200° C. improved by 55 and 69 percent at 10 and 20 megarads, respectively. These unexpected property improvements are of particular interest in wire coating applications as insulation and jacketing materials, and for heat shrinkable structures made from these compositions.

TABLE VIII
EXAMPLES OF GAMMA-IRRADIATED COMPOSITIONS

| Expl No. | Comp. (a) ID | Vol. % Comp. (a) | Comp. (b) ID | Vol. % Comp. (b) | Comp. (c) ID | Vol. % Comp. (c) | Quantity Reactive Groups[1] | Additive #1 ID | PHR Additive #1 | Additive #2 ID | PHR Additive #2 | Ten Str Break 23 C MPa | % Elong Break 23 C |
|---|---|---|---|---|---|---|---|---|---|---|---|---|---|
| C-66 | C | 46.2 | A | 37.0 | G | 16.8 | 3.1 | D | 3.1 | B | 1.0 | 34.8 | 274 |
| 66 | C | 46.2 | A | 37.0 | G | 16.8 | 3.1 | D | 3.1 | B | 1.0 | 38.4 | 295 |
| 67 | C | 46.2 | A | 37.0 | G | 16.8 | 3.1 | D | 3.1 | B | 1.0 | 36.6 | |
| 67A | | | | | | | | | | | | | 263 |
| C-68 | C | 30.2 | A | 52.1 | G | 17.7 | 2.4 | D | 1.0 | B | 1.0 | 21.8 | 265 |
| 68 | C | 30.2 | A | 52.1 | G | 17.7 | 2.4 | D | 1.0 | B | 1.0 | 25.9 | 309 |
| 68A | C | 30.2 | A | 52.1 | G | 17.7 | 2.4 | D | 1.0 | B | 1.0 | 26.4 | 281 |

| Expl No. | % Elong Break 150 C | % Elong Break 200 C | % Ret Ten Str @150 C | % Ret Ten Str @200 C | Comp Set A 150 C % Set | #3 Oil 7 Days/ 100 C | #3 Oil 7 Days/ 150 C | Scrape Abrasion Cycles | Elastic Modulus 23 C MPa | Elastic Modulus 150 C MPa | Elastic Modulus 200 C MPa |
|---|---|---|---|---|---|---|---|---|---|---|---|
| C-66 | 200 | 326 | 40.7 | 35.7 | 2.5 | 7.3 | 15.0 | 5000 | 503.7 | 27.2 | 24.2 |
| 66 | | 281 | | 33.2 | 2.7 | 4.9 | 14.4 | 11000 | 755.6 | | 26.3 |
| 67 | | | | | | | | | 377.8 | | 24.8 |
| 67A | | 245 | | 32.1 | 2.5 | 6.0 | 12.5 | 13000 | | | |
| C-68 | 128 | 171 | 45.5 | 18.3 | 10.9 | 44.0 | 87.7 | | 215.9 | 15.5 | 9.7 |
| 68 | 250 | 258 | 31.3 | 24.0 | 6.9 | 37.7 | 78.5 | | 274.8 | 14.2 | 7.8 |
| 68A | 255 | 234 | 34.0 | 25.6 | 7.1 | 37.0 | 65.6 | | 232.5 | 14.2 | 12.1 |

[1]MMOLS reactive groups/100 g (component b + component c)

The Examples of Table IX show compositions of this invention in which fibers have been blended. These compositions show improvements in abrasion resistance, heat deflection temperature, or both. Compare Example 73 with Comparative Example C-73. Example 73, with only about 5 parts of Kevlar ® fibers added, has about a 3-fold improvement in abrasion resistance. Also observed is an enormous increase in the heat deflection temperature for the composition that contains the Kevlar ® fiber. The HDT goes from 67° C. without the fiber added (Comparative Example C-73), to 210° C. with the fiber added (Example 73). Further, when the fiber is added but the grafting agent is omitted, the large improvement in HDT is not observed. Comparative Example C-73A has the same nylon 66 content and glass fiber content as Example 73A. However, in the Comparative Example, the grafting agent has been omitted. As a result, the HDT is only 80° C. in Comparative Example C-73A, while the HDT in Example 73A has an HDT of 237° C. This enormous improvement is the result of the combination of grafting agent and the presence of fibers.

TABLE IX
EXAMPLES OF COMPOSITIONS WITH NYLON 66 WHICH ARE FIBER FILLED

| Expl No. | Comp (a) ID | Vol. % Comp (a) | Comp (b) ID | Vol. % Comp (b) | Comp (c) ID | Vol. % Comp (c) | Quantity Reactive Groups[1] | Additive #1 ID | PHR Additive #1 | Additive #2 ID | PHR Additive #2 | Additive #3 ID | PHR Additive #3 | Additive #4 ID |
|---|---|---|---|---|---|---|---|---|---|---|---|---|---|---|
| 69 | C | 31.9 | A | 50.6 | G | 17.5 | 2.5 | H | 5.5 | | 0.0 | D | 3.3 | B |

TABLE IX-continued
EXAMPLES OF COMPOSITIONS WITH NYLON 66 WHICH ARE FIBER FILLED

| Expl | | | | | | | | | | | | | |
|---|---|---|---|---|---|---|---|---|---|---|---|---|---|
| 69A | C | 31.9 | A | 50.6 | G | 17.5 | 2.5 | | 0.0 | G | 5.5 | D | 3.3 | B |
| 69B | C | 31.9 | A | 68.1 | G | 0.0 | 0.0 | | 0.0 | G | 5.5 | D | 3.3 | B |
| C-69 | C | 28.4 | A | 53.4 | G | 18.2 | 2.4 | | 0.0 | | 0.0 | D | 3.1 | B |
| 70 | C | 33.9 | A | 49.1 | G | 17.0 | 2.5 | H | 11.6 | | 0.0 | D | 3.5 | B |
| 71 | C | 33.9 | A | 49.1 | G | 17.0 | 2.5 | H | 5.8 | G | 5.8 | D | 3.5 | B |
| 72 | C | 36.2 | A | 47.5 | G | 16.4 | 2.5 | H | 18.5 | | 0.0 | D | 3.7 | B |
| 73 | C | 48.9 | A | 35.1 | G | 15.9 | 3.1 | H | 5.4 | | 0.0 | D | 1.1 | B |
| C-73 | C | 44.1 | A | 38.4 | G | 17.5 | 3.0 | | 0.0 | | 0.0 | D | 1.0 | B |
| 73A | C | 48.9 | A | 35.1 | G | 15.9 | 3.1 | | 0.0 | G | 5.4 | D | 1.1 | B |
| C-73A | C | 48.9 | A | 51.1 | G | 0.0 | 0.0 | | 0.0 | G | 5.4 | D | 1.1 | B |

| Expl No. | PHR Additive #4 | Ten Str Break 23 C MPa | % Elong Break 23 C | % Elong Break 150 C | % Ret Ten Str @150 C | HDT °C. | Taber H18 MG/ 1000 Cycles | NIZOD 23 C Gate J/M | NIZOD 23 C Gate Break Type[2] | NIZOD 23 C Far J/M | NIZOD 23 C Far Break Type[2] | Elastic Modulus 23 C MPa | Elastic Modulus 150 C Mpa |
|---|---|---|---|---|---|---|---|---|---|---|---|---|---|
| 69 | 1.1 | | | | | 64 | 184 | 614 | NB | 507 | NB | | |
| 69A | 1.1 | 23.2 | 141 | 100 | 26.0 | 61 | | 780 | NB | 769 | NB | 274.6 | 33.1 |
| 69B | 1.1 | 20.8 | 140 | 78 | 18.3 | 58 | | 870 | NB | 972 | NB | 291.9 | 18.6 |
| C-69 | 1.0 | 24.0 | 230 | 150 | 26.4 | 49 | 250 | 1068 | NB | 1068 | NB | 200.1 | 21.4 |
| 70 | 1.2 | 25.0 | 41 | 38 | 32.8 | 193 | 102 | 288 | NB | 294 | PB | 377.8 | 46.9 |
| 71 | 1.2 | 22.2 | 72 | 50 | 32.3 | 110 | 175 | 422 | NB | 464 | PB | 432.6 | 58.0 |
| 72 | 1.2 | 30.9 | 29 | 33 | 29.6 | 235 | 160 | 166 | NB | 187 | PB | 503.7 | 75.2 |
| 73 | 1.1 | 31.7 | 45 | 77 | 37.3 | 210 | 78 | 299 | PB | 315 | PB | 755.6 | 68.3 |
| C-73 | 1.0 | 31.3 | 270 | 230 | 36.2 | 67 | 218 | 1068 | NB | 1068 | NB | 596.2 | 65.6 |
| 73A | 1.1 | 28.3 | 98 | 174 | 46.3 | 237 | | 849 | NB | 876 | NB | 672.8 | 46.9 |
| C-73A | 1.1 | 31.6 | 150 | 91 | 32.8 | 80 | | 1132 | NB | 1207 | NB | 503.7 | 33.8 |

[1] MMOLS reactive groups/100 g (component b + component c)
[2] NB = No break, PB = Partial break Examples 74 to 77 together with Comparative Examples C-74 and C-76 in Table X, illustrate the compositions of the present invention using nylon 612. In the Comparative Examples, the grafting agent has been omitted. As a result, the outstanding retention of high temperature properties is not observed in these Comparative Examples. In the Examples where the polymeric grafting agent is employed, the outstanding properties are observed.

Comparative Example C-78 and C-80 are provided, which contain EPDM rubber grafted with fumaric acid. All compositions show excellent retention of tensile properties at 150° C., however, the Comparative Examples show poor high temperature tensile strengths.

Nylon 12 is more susceptible to swelling in #3 oil due to its greater aliphatic content; therefore, these compositions described in Table XI have proportionally higher oil swells than compositions described in Tables IV to X.

TABLE X
EXAMPLES OF COMPOSITIONS WITH NYLON 6,12

| Expl No. | Comp (a) ID | Vol. % Comp (a) | Comp (b) ID | Vol. % Comp (b) | Comp (c) ID | Vol. % Comp (c) | Quantity Reactive Groups[1] | Additive #1 ID | PHR Additive #1 | Additive #2 ID | PHR Additive #2 | Ten Str Break 23 C MPa | % Elong Break 23 C |
|---|---|---|---|---|---|---|---|---|---|---|---|---|---|
| 74 | D | 27.9 | P | 52.9 | G | 19.2 | 2.6 | D | 1.5 | B | 1.0 | 25.6 | 242 |
| C-74 | D | 27.9 | A | 72.1 | | 0.0 | 0.0 | D | 1.5 | B | 1.0 | 24.0 | 267 |
| 75 | D | 36.7 | P | 52.8 | G | 10.5 | 1.3 | L | 20.0 | B | 1.2 | 22.1 | 371 |
| 76 | D | 37.7 | A | 51.5 | G | 10.8 | 1.7 | D | 1.5 | B | 1.0 | 31.2 | 315 |
| C-76 | D | 37.7 | A | 62.3 | | 0.0 | 0.0 | D | 1.5 | B | 1.0 | 29.7 | 301 |
| 77 | D | 47.8 | A | 46.7 | G | 5.5 | 1.0 | D | 1.5 | B | 1.0 | 32.2 | 293 |

| Expl No. | % Elong Break 150 C | % Ret Ten Str @ 150 C | #3 Oil 100 C/70 HR % Swell | Hardness Shore D | Elastic Modulus 23 C MPa | Elastic Modulus 100 C MPa | Elastic Modulus 150 C MPa | #1 Oil 70 C/ 70 HR % Swell | #1 Oil 100 C/ 70 HR % Swell | #3 Oil 70 C/ 70 HR % Swell |
|---|---|---|---|---|---|---|---|---|---|---|
| 74 | 190 | 19.3 | 76.8[2] | 53 | 142.8 | 16.4 | 10.2 | 10.6[2] | 31.0[2] | 60.4[2] |
| C-74 | 152 | 5.5 | 175[2] | 53 | 86.1 | 6.3 | 1.9 | 16.8[2] | 49.4[2] | 117.5[2] |
| 75 | 321 | 35.9 | 17.7[2] | 50 | 158.7 | | 10.9 | 0.1 | 1.7 | 9.3 |
| 76 | 289 | 25.7 | 23.6[2] | 62 | 198.4 | 37.7 | 35.1 | 0.7[2] | 7.6[2] | 10.7[2] |
| C-76 | 207 | 18.8 | 45.2[2] | 62 | 216.1 | 30.2 | 23.2 | 3.9[2] | 12.3[2] | 28.3[2] |
| 77 | 355 | 37.7 | 8.1[2] | 65 | 215.9 | 42.7 | 40.2 | 0.0[2] | 1.4[2] | 4.3[2] |

[1] MMOLS reactive groups/100 g (component b + component c)
[2] 1/16" thick specimens Examples 78 to 81 in Table XI illustrate the composition of the present invention using nylon 12. Several compositions with varying amounts of nylon 12 are illustrated.

TABLE XI
EXAMPLES OF COMPOSITIONS WITH NYLON 12

| | | PHR | PHR | Ten Str |

TABLE XI-continued

EXAMPLES OF COMPOSITIONS WITH NYLON 12

| Expl No. | Comp (a) ID | Vol. % Comp (a) | Comp (b) ID | Vol. % Comp (b) | Comp (c) ID | Vol. % Comp (c) | Quantity Reactive Groups[1] | Additive #1 ID | Additive #1 | Additive #2 ID | Additive #2 | Break 23 C MPa |
|---|---|---|---|---|---|---|---|---|---|---|---|---|
| 78 | E | 32.8 | A | 50.2 | H | 17.1 | 2.4 | D | 3.1 | B | 1.0 | 22.6 |
| C-78 | E | 30.1 | A | 52.1 | I | 17.8 | 0.0 | D | 3.1 | B | 1.0 | 20.0 |
| 79 | E | 32.8 | E | 50.2 | H | 17.1 | 2.4 | D | 3.1 | B | 1.0 | 16.6 |
| 80 | E | 39.5 | A | 42.5 | H | 18.0 | 2.9 | D | 2.1 | B | 1.0 | 26.9 |
| C-80 | E | 36.6 | A | 44.5 | I | 18.9 | 0.0 | D | 2.1 | B | 1.0 | 24.9 |
| 81 | F | 49.2 | A | 34.9 | H | 15.9 | 3.0 | D | 1.0 | B | 1.0 | 30.2 |

| Expl No. | % Elong Break 23 C | % Elong Break 150 C | % Ret Ten Str @ 150 C | #3 Oil 100 C/70 HR % Swell | Hardness Shore D | Elastic Modulus 23 C MPa | Elastic Modulus 150 C MPa | #1 Oil 70 C/70 HR % Swell | #1 Oil 100 C/70 HR % Swell | #3 Oil 70 C/70 HR % Swell |
|---|---|---|---|---|---|---|---|---|---|---|
| 78 | 294 | 293 | 17.6 | 86.0[2] | 52 | 94.7 | 4.8 | 13.3[2] | 27.0[2] | 59.7[2] |
| C-78 | 339 | 279 | 10.3 | 187[2] | 47 | 75.7 | 2.4 | 24.0[2] | 56.0[2] | 128[2] |
| 79 | 249 | 217 | 19.7 | 106[2] | 48 | 97.6 | 4.6 | 25.3[2] | 42.2[2] | 86.4[2] |
| 80 | 297 | 298 | 24.9 | 60.0[2] | 55 | 144.3 | 8.5 | 5.5[2] | 13.9[2] | 30.0[2] |
| C-80 | 340 | 280 | 8.3 | 12.3[2] | 52 | 163.7 | 5.6 | 16.0[2] | 31.0[2] | 63.0[2] |
| 81 | 350 | 430 | 28.1 | 18.0[2] | 60 | 237.3 | 104.2 | 1.9[2] | 3.3[2] | 6.6[2] |

[1]MMOLS reactive groups/100 g (component b + component c)
[2]1/16" thick specimens Example 82 and Comparative Example C-82 in Table XII illustrate the compositions of the present invention using amorphous nylon. Example 82 shows better retention of elastic modulus and tensile strength at break at high temperatures than does Comparative Example C-82.

cent. Two different polyesters are exemplified, polybutylene-terphthalate (PBT) and a co-polyester containing PBT and poly-tetramethylene glycol (PTMEG) soft segments. All compositions exemplified show both excellent retention of tensile strength at 50° C. and resistance to swell in ASTM #3 oil. It is also notewor-

TABLE XII

EXAMPLES OF COMPOSITIONS WITH AMORPHOUS NYLONS

| Expl No. | Comp (a) ID | Vol % Comp (a) | Comp (b) ID | Vol % Comp (b) | Comp (c) ID | Vol % Comp (c) | Quantity Reactive Groups[1] | Ten Str Break 23 C MPa | Ten Str Break 100 C MPa |
|---|---|---|---|---|---|---|---|---|---|
| 82 | G | 36.7 | N | 58.0 | G | 5.3 | 0.8 | 29.0 | 7.8 |
| C-82 | G | 36.7 | N | 63.3 | | | 0.0 | 27.8 | 4.8 |

| Expl No. | % Elong Break 23 C | % Elong Break 100 C | #1 Oil 70 C/70 HR % Swell | Hardness Shore D | Elastic Modulus 23 C MPa | Elastic Modulus 100 C MPa | Elastic Modulus 150 C MPa | #3 Oil 70 C/70 HR % Swell |
|---|---|---|---|---|---|---|---|---|
| 82 | 202 | 121 | 3.4 | 66 | 95.5 | 47.4 | 0.3 | 17.1 |
| C-82 | 206 | 106 | 7.2 | 65 | 124.3 | 22.7 | 0.1 | 32.0 |

[1]MMOLS reactive groups/100 g (component b + component c)

Examples 83 to 93 and Comparative Examples C-86, C-86A and C-86B in Table XIII illustrate the compositions of the present invention using polyesters and co-polyesters. With these polyester-based compositions, as with the polyamide-based compositions, improved retention of tensile strength at elevated temperature and resistance to swell in ASTM #3 oil is observed. Examples 83, 84, 85 and 86 are partially grafted blends of compositions using component a, co-polyether ester H, as the continuous thermoplastic phase. Various amounts of grafting agent are used. All compositions exemplified at about 30 volume percent polyester that have a level of grafting agent greater than about 2.5 MMOLS reactive groups/100g (component b plus component c), have improved retention of tensile strength at high temperature, namely, greater than or equal to about 18% retention of tensile strength at 150° C. Comparative Examples C-86, C-86A and C-86B demonstrate that at low polyester levels in the absence of the proper grafting levels and/or mixing history, poor high temperature properties result.

Examples 87 to 93 show compositions with levels of polyester ranging between about 37 to 39 volume perthy to mention the difference between the retention of tensile strengths at 150° C. between Examples 87 and 88, with 23% and 36%, retentions, respectively. These Examples have compositions that are essentially identical, with the exception that a small amount of zinc acetate was included in Example 88. This is known to catalyze the grafting reaction between the epoxide-containing grafting agent and the polyester component. Use of zinc acetate and other catalysts are well known to promote this reaction.

It should be noted that the morphology of Comparative Examples C-86, C-86A, and C-86B when examined microscopically showed that the component a was not present as at least one of the continuous phases even though the level of reactive groups was 2.2 MMOLS reactive groups/100g (component b+ component c). It is believed that when component a is polyester and the reactive groups of component c are epoxy, then the minimum level of reactive groups necessary to achieve component a as at least one of the continuous phases is greater because some of the epoxy is consumed by insertion reactions with the polyester.

TABLE XIII

EXAMPLES OF COMPOSITIONS WITH POLYESTERS AND COPOLYESTERS

| Comp | Vol. % | Comp | Vol. % | Comp | Vol % | Comp | Vol % | Quantity | Addi- | PHR | Addi- |

TABLE XIII-continued
EXAMPLES OF COMPOSITIONS WITH POLYESTERS AND COPOLYESTERS

| Expl No. | (a) ID | Comp (a) | (b) ID #1 | Comp (b) | (b) ID #2 | Comp (b) | (c) ID | Comp (c) | Reactive Groups[1] | Additive #1 ID | Additive #1 | Additive #2 ID |
|---|---|---|---|---|---|---|---|---|---|---|---|---|
| 83    | H | 29.7 |   | 0.0  | A | 43.3 | G | 27.1 | 3.8  | A | 1.0 |   |
| 84    | H | 29.7 |   | 0.0  | A | 43.3 | H | 27.1 | 14.2 | A | 1.0 |   |
| 85    | H | 29.7 | O | 43.3 |   | 0.0  | H | 27.1 | 14.2 | A | 1.0 |   |
| 86    | H | 29.7 |   | 0.0  | A | 59.5 | H | 10.8 | 8.9  | A | 1.0 |   |
| C-86  | H | 30.0 | O | 42.7 | A | 10.9 | G | 16.4 | 2.3  | A | 1.0 |   |
| C-86A | I | 27.8 | O | 44.1 | A | 11.2 | G | 16.9 | 2.2  | A | 1.0 |   |
| C-86B | J | 29.7 | O | 42.9 | A | 11.0 | G | 16.4 | 2.2  | A | 1.0 |   |
| 87    | I | 36.9 | O | 42.1 |   | 0.0  | G | 21.0 | 3.3  | A | 1.0 |   |
| 88    | I | 37.3 | O | 41.4 |   | 0.0  | G | 21.3 | 3.4  | A | 1.0 | I |
| 89    | I | 36.9 | O | 37.4 | A | 11.7 | G | 14.0 | 2.2  | A | 1.0 |   |
| 90    | I | 36.9 | O | 19.9 | A | 11.7 | G | 31.6 | 5.0  | A | 1.0 |   |
| 91    | J | 39.1 | O | 29.3 | A | 11.3 | G | 20.3 | 3.3  | A | 1.0 |   |
| 92    | J | 39.1 | O | 36.1 | A | 11.3 | G | 13.5 | 2.2  | A | 1.0 |   |
| 93    | J | 39.1 | O | 19.2 | A | 11.3 | G | 30.4 | 5.0  | A | 1.0 |   |

| Expl No. | PHR Additive #2 | Ten Str Break 23 C MPa | % Elong Break 23 C | % Elong Break 150 C | % Ret Ten Str @ 150 C | #3 Oil 100 C/70 HR % Swell | Hardness Shore D | Elastic Modulus 23 C MPa | Elastic Modulus 100 C MPa | Elastic Modulus 150 C MPa |
|---|---|---|---|---|---|---|---|---|---|---|
| 83    | 0.0 | 13.1 | 290 | 160 | 18.4 | 119[2]  | 39 | 35.5  | 6.3  | 4.0  |
| 84    | 0.0 | 14.1 | 230 | 80  | 21.2 | 82.0[2] | 37 | 34.8  | 9.5  | 6.1  |
| 85    | 0.0 | 12.9 | 218 | 70  | 20.9 | 83.0[2] | 35 | 36.8  | 7.1  | 6.7  |
| 86    | 0.0 | 13.5 | 217 | 82  | 18.3 | 89.0[2] | 40 | 37.3  | 7.3  | 5.0  |
| C-86  | 0.0 | 16.0 | 345 | 166 | 11.6 | 119[2]  | 37 | 29.7  |      | 3.5  |
| C-86A |     | 23.3 | 333 | 121 | 14.5 | 92.0[2] | 52 | 137.4 |      | 8.5  |
| C-86B |     | 18.5 | 358 | 156 | 13.6 | 113[2]  | 41 | 34.8  |      | 4.5  |
| 87    | 0.0 | 23.5 | 360 | 190 | 22.9 | 39.1    | 57 | 224.7 |      | 13.2 |
| 88    | 1.0 | 18.6 | 200 | 230 | 35.6 | 33.3    | 60 | 254.3 |      | 18.4 |
| 89    | 0.0 | 26.8 | 400 | 230 | 21.9 | 34.0    | 60 | 281.7 |      | 17.0 |
| 90    | 0.0 | 16.1 | 170 | 210 | 38.5 | 37.6    | 58 | 235.4 |      | 12.4 |
| 91    | 0.0 | 20.7 | 390 | 270 | 24.3 | 58.1    | 43 | 53.0  |      | 7.9  |
| 92    | 0.0 | 20.1 | 430 | 220 | 16.5 | 58.5    | 43 | 49.3  |      | 7.1  |
| 93    | 0.0 | 16.1 | 350 | 270 | 27.4 | 62.8    | 42 | 47.7  |      | 7.6  |

[1] MMOLS reactive groups/100 g (component b + component c)
[2] 1/16" thick specimen Examples 94 to 99 in Table XIV show compositions of the present invention where the thermoplastic component is polycarbonate. Polycarbonate is an amorphous thermoplastic with a Tg of about 150° C. and a maximum recommended upper use temperature of about 130° C. Therefore, it is inappropriate to determine retention of tensile strength at 150° C., as in the case of the partially crystalline thermoplastics exemplified in this invention. For this reason, retention of tensile strengths at 100° C. are used to illustrate the use of this amorphous thermoplastic in this invention. At this temperature, retentions of tensile strengths for compositions containing thermoplastic, component a, of about 25 volume%, Examples 94 to 96, and compositions containing about 44 volume %, Examples 97 to 99, are given. Retention of tensile strengths at 100° C. range from about 30% to about 41%. These retentions exemplify, and are typical of the current invention as applied to this thermoplastic component a.

TABLE XIV
EXAMPLES OF COMPOSITIONS WITH POLYCARBONATE

| Expl No. | Comp (a) ID | Vol. % Comp (a) | Comp (b) ID | Vol. % Comp (b) | Comp (c) ID | Vol. % Comp (c) | Quantity Reactive Groups[1] | Additive #1 ID | PHR Additive #1 | Ten Str Break 23 C MPa | % Elong @ Break 23 C |
|---|---|---|---|---|---|---|---|---|---|---|---|
| 94 | L | 25.4 | A | 49.7 | H | 24.9 | 3.3 | B | 1.0 | 11.5 | 60  |
| 95 | L | 25.4 | E | 55.9 | H | 18.6 | 2.5 | B | 1.0 | 11.1 | 60  |
| 96 | L | 25.4 | E | 49.7 | H | 24.9 | 3.3 | B | 1.0 | 11.0 | 60  |
| 97 | L | 44.4 | A | 41.7 | H | 13.9 | 2.5 | B | 1.0 | 24.2 | 100 |
| 98 | L | 44.4 | E | 41.7 | H | 13.9 | 2.5 | B | 1.0 | 18.6 | 70  |
| 99 | L | 44.4 | E | 37.1 | H | 18.5 | 3.3 | B | 1.0 | 19.2 | 50  |

| Expl No. | % Elong @ Break 100 C | % Ret Ten Str @ 100 C | Elastic Modulus 23 C MPa | Elastic Modulus 100 C MPa | Elastic Modulus 150 C MPa |
|---|---|---|---|---|---|
| 94 | 30 | 21.0 | 94.5  | 22.8  | 1.6 |
| 95 | 40 | 24.0 | 108.0 | 30.0  | 0.8 |
| 96 | 30 | 27.0 | 102.5 | 34.4  | 1.3 |
| 97 | 40 | 29.8 | 251.8 | 151.1 | 1.3 |
| 98 | 40 | 37.8 | 318.2 | 88.9  | 1.0 |
| 99 | 40 | 40.6 | 318.2 | 125.9 | 1.4 |

[1] MMOLS reactive sites/100 g (component b + component c)

I claim:

1. A partially grafted, multi-phase flexible thermoplastic composition formed by melt blending:
   a) 25–50 volume % of at least one polyamide resin having graft sites, the polyamide comprising at least one continuous phase of the composition, and the polyamide having a number average molecular weight of at least 5,000, b) 10-74 volume % of at least one ethylene copolymer, E/X/Y, where E is ethylene and is at least 50 weight % of E/X/Y, X is 1-35 weight % of an unsaturated mono-carboxylic acid, and Y is 0-49 weight % of a moiety derived from at least one alkyl acrylate, alkyl methacrylate, alkyl vinyl ether, carbon monoxide, sulfur dioxide, or mixtures thereof where the alkyl groups contain 1-12 carbon atoms, and further wherein the acid groups in the acid-containing moiety are neutralized from 0-100% by a metal ion, and c) 1-50 volume % of at least one polymeric grafting agent which contains reactive groups selected from at least one of epoxides, isocyanates, axiridine, silanes, alkyl halides, alpha-halo ketones, alpha-halo aldehydes, or oxazoline, which grafting agents react with the acid-containing moieties in component b) and additionally react with the graft sites of component a) and wherein the quantity of reactive groups x, provided to the composition by the grafting agent expressed as MMOLS of reactive groups per one hundred grams of component b) plus component c) is defined by the following formula:

$$d-(a)\cdot(m)<x<16$$

where
a = volume % of component a),
d = 0.9 MMOLS of reactive groups per 100 grams of component b) plus component c)

$$m = 0.016 \left[ \frac{\left( \begin{array}{c} \text{MMOLS of reactive groups per} \\ \text{100 g of component b) plus component c)} \end{array} \right)}{\text{volume \% of component a)}} \right]$$

and further wherein the weight percent of monomers containing the reactive groups is 0.5-15 weight percent of the polymeric grafting agent, component c), the remainder of the polymeric grafting agent contains at least 50 weight % of ethylene and from 0-49 weight % of a moiety derived from at least one alkyl acrylate, alkyl methacrylate, alkyl vinyl ether, carbon monoxide, sulfur dioxide, or mixtures thereof where the alkyl groups contain 1-12 carbon atoms, the above volume percentages for components a), b) and c) are based on the total of component a), component b), and component c) only and are calculated from the densities of the individual components prior to mixing.

2. The composition of claim 1 wherein component a) is selected from nylon 66, nylon 612 and nylon 6.

3. The composition of claim 1 wherein component a) is present in an amount of 27-48 volume percent, component b) is present in an amount of 20-69 volume percent, and component c) is present in an amount of 4-35 volume percent.

4. The composition of claim 1 wherein component a) is present in an amount of 28-46 volume percent, component b) is present in an amount of 30-65 volume percent, and component c) is present in an amount of 7-25 volume percent.

5. The composition of claim 1 wherein component b) comprises at least 55 weight % ethylene, 3-30 weight % of an unsaturated mono-carboxylic acid, and 0-35 weight % of a moiety derived from at least one alkyl acrylate, alkyl methacrylate and mixtures thereof where the alkyl radicals contain 1-8 carbon atoms and further where the acid groups in the unsaturated mono-carboxylic acid are neutralized 0-80% by at least one metal ion selected from sodium, zinc, magnesium, calcium, potassium and lithium.

6. The composition of claim 6 wherein component b) comprises at least 60 weight % ethylene, 5-15 weight percent of an acid-containing moiety selected from methacrylic acid and acrylic acid, and 0-25 weight percent of a moiety derived from at least one of methyl acrylate, iso-butyl acrylate and n-butyl acrylate, and further wherein the acid groups are neutralized from 30-70% by at least one metal ion selected from sodium, zinc, magnesium and calcium.

7. The composition of claim 1 wherein component c) contains reactive groups selected from epoxides containing 4-11 carbon atoms, wherein the quantity of reactive groups, x, provided to the composition by component c), expressed as MMOLS of reactive groups per 100 grams of component b) plus component c) is defined by the following formula:

$$d-(a)\cdot(m)<x<10$$

where
a = volume % of component a),
d = 1.8 MMOLS of reactive groups per 100 grams of component b) plus component c), and
m = 0.03 with the same units as defined in claim 1, and further wherein the weight percent of monomers containing reactive groups is 1-10 weight percent of the polymeric grafting agent, component c), and the remainder of component c) contains at least 55 weight % ethylene and 0-35 weight % of a moiety derived from at least one alkyl acrylate, alkyl methacrylate, or mixtures thereof where the alkyl radicals contain 1-8 carbon atoms.

8. The composition of claim 7 wherein component c) contains reactive groups selected from epoxides derived from glycidyl methacrylate and glycidyl acrylate wherein the quantity of reactive groups, x, is defined by the formula:

$$d-(a)\cdot(m)<x<5$$

where
a is as defined above,
d = 3.6 with the same units as defined above, and
m = 0.06 with the same units as defined above,
and further wherein the quantity of reactive groups in component c) is 1-7 weight %, and the remainder of component c) contains at least 60 weight % ethylene, and 0-25 weight % of a moiety selected from methyl acrylate, iso-butyl acrylate and n-butyl acrylate.

* * * * *

UNITED STATES PATENT AND TRADEMARK OFFICE
CERTIFICATE OF CORRECTION

PATENT NO. : 5,091,478
DATED : February 25, 1992
INVENTOR(S) : Robert Philip Saltman It is certified that error appears in the above—identified patent and that said Letters Patent is hereby corrected as shown below:

Column 33, line 14, "axiridine" should be --aziridine--.

Column 34, line 13, "6" (second occurrence) should be --5--.

Signed and Sealed this

Second Day of August, 1994

Attest:

BRUCE LEHMAN

Attesting Officer    Commissioner of Patents and Trademarks